US012398906B2

(12) United States Patent
Wei et al.

(10) Patent No.: US 12,398,906 B2
(45) Date of Patent: Aug. 26, 2025

(54) AIR CONDITIONING CONTROL SYSTEM

(71) Applicant: DAIKIN INDUSTRIES, LTD., Osaka (JP)

(72) Inventors: Yaguang Wei, Osaka (JP); Tomohiro Mashita, Suita (JP); Tetsuya Kanayama, Suita (JP); Photchara Ratsamee, Suita (JP); Yuki Uranishi, Suita (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 92 days.

(21) Appl. No.: 17/912,468

(22) PCT Filed: Mar. 25, 2021

(86) PCT No.: PCT/JP2021/012461
§ 371 (c)(1),
(2) Date: Sep. 16, 2022

(87) PCT Pub. No.: WO2021/193796
PCT Pub. Date: Sep. 30, 2021

(65) Prior Publication Data
US 2024/0210065 A1    Jun. 27, 2024

(30) Foreign Application Priority Data

Mar. 25, 2020  (JP) ................................. 2020-055108
Aug. 19, 2020  (JP) ................................. 2020-138933

(51) Int. Cl.
*F24F 11/64*  (2018.01)
*F24F 11/62*  (2018.01)

(52) U.S. Cl.
CPC .............. *F24F 11/64* (2018.01); *F24F 11/62* (2018.01); *G05B 2219/2614* (2013.01)

(58) Field of Classification Search
CPC .... F24F 11/64; F24F 11/62; G05B 2219/2614
See application file for complete search history.

(56) References Cited

U.S. PATENT DOCUMENTS

2009/0276193 A1   11/2009  Momose et al.
2018/0283723 A1   10/2018  Ock et al.
(Continued)

FOREIGN PATENT DOCUMENTS

CN      109631265 A      4/2019
JP      2012-149839 A    8/2012
(Continued)

OTHER PUBLICATIONS

International Preliminary Report of corresponding PCT Application No. PCT/JP2021/012461 dated Oct. 6, 2022.
(Continued)

*Primary Examiner* — Michael W Choi
(74) *Attorney, Agent, or Firm* — GLOBAL IP COUNSELORS, LLP

(57) ABSTRACT

An air conditioning control system transmits control content to an air conditioning apparatus and adjusts an environmental state in a target space. The air conditioning control system includes an acquisition unit and a control content determination unit. The acquisition unit acquires a target environmental state. The control content determination unit has a learning model having an input and an output. The input is the target environmental state. The output is determined control content. The determined control content is the control content to be transmitted to the air conditioning apparatus in order to bring the target space closer to the target environmental state. The learning model has been trained by using, as a learning dataset, learning control content and a learning environmental state. The learning control content is the control content for the air conditioning
(Continued)

apparatus. The learning environmental state is the environmental state in the target space.

19 Claims, 22 Drawing Sheets

(56) References Cited

U.S. PATENT DOCUMENTS

| | | |
|---|---|---|
| 2019/0101315 A1 | 4/2019 | Hada et al. |
| 2019/0187635 A1* | 6/2019 | Fan .................. F24F 11/63 |
| 2019/0360718 A1 | 11/2019 | Ozaki |
| 2020/0159175 A1* | 5/2020 | Watanabe .......... G05D 1/101 |
| 2021/0088244 A1 | 3/2021 | Kim et al. |
| 2021/0102722 A1* | 4/2021 | Nabi .................. F24F 11/46 |
| 2021/0190362 A1 | 6/2021 | Ko et al. |
| 2021/0215370 A1 | 7/2021 | Moon et al. |

FOREIGN PATENT DOCUMENTS

| | | |
|---|---|---|
| JP | 2014-190686 A | 10/2014 |
| JP | 2016-61447 A | 4/2016 |
| JP | 2018-151095 A | 9/2018 |
| JP | 2019-66135 A | 4/2019 |
| JP | 2019-522163 A | 8/2019 |
| KR | 20190096311 A | 8/2019 |
| KR | 20190096878 A | 8/2019 |
| KR | 20190114929 A | 10/2019 |
| WO | 2007/122677 A1 | 11/2007 |
| WO | 2018/070101 A1 | 4/2018 |
| WO | 2018/179750 A1 | 10/2018 |
| WO | 2018/182357 A1 | 10/2018 |

OTHER PUBLICATIONS

European Search Report of corresponding EP Application No. 21 775 119.7 dated Mar. 1, 2024.
International Search Report of corresponding PCT Application No. PCT/JP2021/012461 dated Jun. 8, 2021.

* cited by examiner

| TEMPERATURE | HUMIDITY | AIR FLOW DIRECTION | AIR VOLUME | AIR VELOCITY | ... |
|---|---|---|---|---|---|
| 20°C | 50% | 60 DEGREES WITH RESPECT TO HORIZONTAL | 4 | 3 | ... |

FIG. 4

| TEMPERATURE | HUMIDITY | AIR FLOW DIRECTION | AIR VOLUME | AIR VELOCITY | ... |
|---|---|---|---|---|---|
| 20°C | 50% | 60 DEGREES WITH RESPECT TO HORIZONTAL | 4 | 3 | ... |
| 23°C | 60% | 50 DEGREES WITH RESPECT TO HORIZONTAL | 3 | 1 | ... |
| 19°C | 40% | 30 DEGREES WITH RESPECT TO HORIZONTAL | 5 | 2 | ... |
| ... | ... | ... | ... | ... | ... |

FIG. 5

AIR CONDITIONING CONTROL SYSTEM

CROSS-REFERENCE TO RELATED APPLICATIONS

This U.S. National stage application claims priority under 35 U.S.C. § 119(a) to Japanese Patent Application Nos. 2020-055108, filed in Japan on Mar. 25, 2020 and 2020-138933, filed in Japan on Aug. 19, 2020, the entire contents of which are hereby incorporated herein by reference.

BACKGROUND

Technical Field

The present disclosure relates to an air conditioning control system.

Background Art

There is a technique of determining control content of an air conditioning apparatus so as to bring a target space of an air conditioning operation performed by the air conditioning apparatus into an environmental state desired by a user. In Japanese Unexamined Patent Application Publication (Translation of PCT Application) No. 2019-522163, control content of an air conditioning apparatus is determined by using a learning system including a reinforcement learning algorithm and measurement values obtained from sensors at various locations in a target space.

SUMMARY

In reinforcement learning, a reward function is determined in accordance with an environmental state desired by a user, a value function is learned by using the reward function, and control content of the air conditioning apparatus is determined. Thus, in a case where control content of the air conditioning apparatus is to be determined in real time, the method using reinforcement learning involves an issue that a relatively long time is taken.

An air conditioning control system according to a first aspect is configured to transmit control content to an air conditioning apparatus and adjust an environmental state in a target space of an air conditioning operation performed by the air conditioning apparatus. The air conditioning control system includes an acquisition unit and a control content determination unit. The acquisition unit is configured to acquire a target environmental state. The target environmental state is the environmental state to be achieved. The control content determination unit has a learning model. The learning model has an input. The input is the target environmental state. The learning model has an output. The output is determined control content. The determined control content is the control content to be transmitted to the air conditioning apparatus for bringing the target space closer to the target environmental state. The learning model has been trained by using, as a learning dataset, learning control content and a learning environmental state. The learning control content is the control content for the air conditioning apparatus. The learning environmental state is the environmental state in the target space.

In the air conditioning control system according to the first aspect, the air conditioning control system determines, by using the learning model, determined control content to be transmitted to the air conditioning apparatus for bringing the target space closer to the target environmental state. The learning model is a trained model. Thus, the air conditioning control system is capable of determining, in more real time, the determined control content for achieving the target environmental state.

An air conditioning control system according to a second aspect is the air conditioning control system according to the first aspect, in which the target environmental state is the environmental state to be achieved in a partial space. The partial space is a part of the target space. The determined control content is the control content to be transmitted to the air conditioning apparatus for bringing the partial space closer to the target environmental state. The learning environmental state is the environmental state in the partial space.

In the air conditioning control system according to the second aspect, the target environmental state is the environmental state to be achieved in a partial space. The partial space is a part of the target space. The determined control content is the control content to be transmitted to the air conditioning apparatus for bringing the partial space closer to the target environmental state. The learning environmental state is the environmental state in the partial space. Thus, the air conditioning control system is capable of bringing a part of the target space into the environmental state to be achieved in a pinpoint manner.

An air conditioning control system according to a third aspect is the air conditioning control system according to the second aspect, in which the partial space is a predetermined three-dimensional region in the target space.

In the air conditioning control system according to the third aspect, the partial space is a predetermined three-dimensional region in the target space. Thus, the air conditioning control system is capable of bringing the predetermined three-dimensional region in the target space into the environmental state to be achieved.

An air conditioning control system according to a fourth aspect is the air conditioning control system according to the second aspect, in which the partial space is a predetermined two-dimensional region in the target space.

In the air conditioning control system according to the fourth aspect, the partial space is a predetermined two-dimensional region in the target space. Thus, the air conditioning control system is capable of bringing the predetermined two-dimensional region in the target space into the environmental state to be achieved.

An air conditioning control system according to a fifth aspect is the air conditioning control system according to any of the first aspect to the fourth aspect, in which the learning environmental state is an output result of one or more simulations performed by using the learning control content as an input.

In the air conditioning control system according to the fifth aspect, the air conditioning control system performs one or more simulations by using the learning control content as an input, and acquires the learning environmental state. Thus, the air conditioning control system is capable of easily acquiring the learning dataset.

An air conditioning control system according to a sixth aspect is the air conditioning control system according to any of the first aspect to the fifth aspect, in which the control content is an air conditioning control parameter including an amount regarding at least one of temperature, humidity, air flow direction, air volume, and air velocity.

An air conditioning control system according to a seventh aspect is the air conditioning control system according to any of the first aspect to the sixth aspect, in which the environmental state is an environmental parameter at one or more locations in the target space. The environmental parameter includes an amount regarding at least one of temperature, humidity, air flow direction, air volume, and air velocity.

An air conditioning control system according to an eighth aspect is the air conditioning control system according to any one of the first aspect to the seventh aspect, in which the target environmental state is determined based on a desire regarding the environmental state input via a user interface.

In the air conditioning control system according to the eighth aspect, a user sets the target environmental state via the user interface. Thus, the user is able to easily set a desired target environmental state.

An air conditioning control system according to a ninth aspect is the air conditioning control system according to any of the first aspect to the eighth aspect, in which the learning dataset further includes space layout information. The space layout information is information on an object in the target space.

In the air conditioning control system according to the ninth aspect, the learning dataset further includes space layout information. The space layout information is information on an object in the target space. Thus, the amount of information to be learned by the learning model increases, and the accuracy of the determined control content output by the learning model increases.

An air conditioning control system according to a tenth aspect is the air conditioning control system according to the ninth aspect, in which the space layout information includes, as the information on the object in the target space, information regarding an amount of heat.

An air conditioning control system according to an eleventh aspect is the air conditioning control system according to any of the first aspect to the tenth aspect, in which the learning dataset further includes arrangement information of one or more air outlets of one or more air conditioning apparatuses.

In the air conditioning control system according to the eleventh aspect, the learning dataset further includes arrangement information of one or more air outlets of one or more air conditioning apparatuses. Thus, the amount of information to be learned by the learning model increases, and the accuracy of the determined control content output by the learning model increases.

BRIEF DESCRIPTION OF DRAWINGS

FIG. 4 is a diagram illustrating control content.

FIG. 5 is a diagram illustrating learning control content.

DETAILED DESCRIPTION OF EMBODIMENT(S)

Figure 1A:
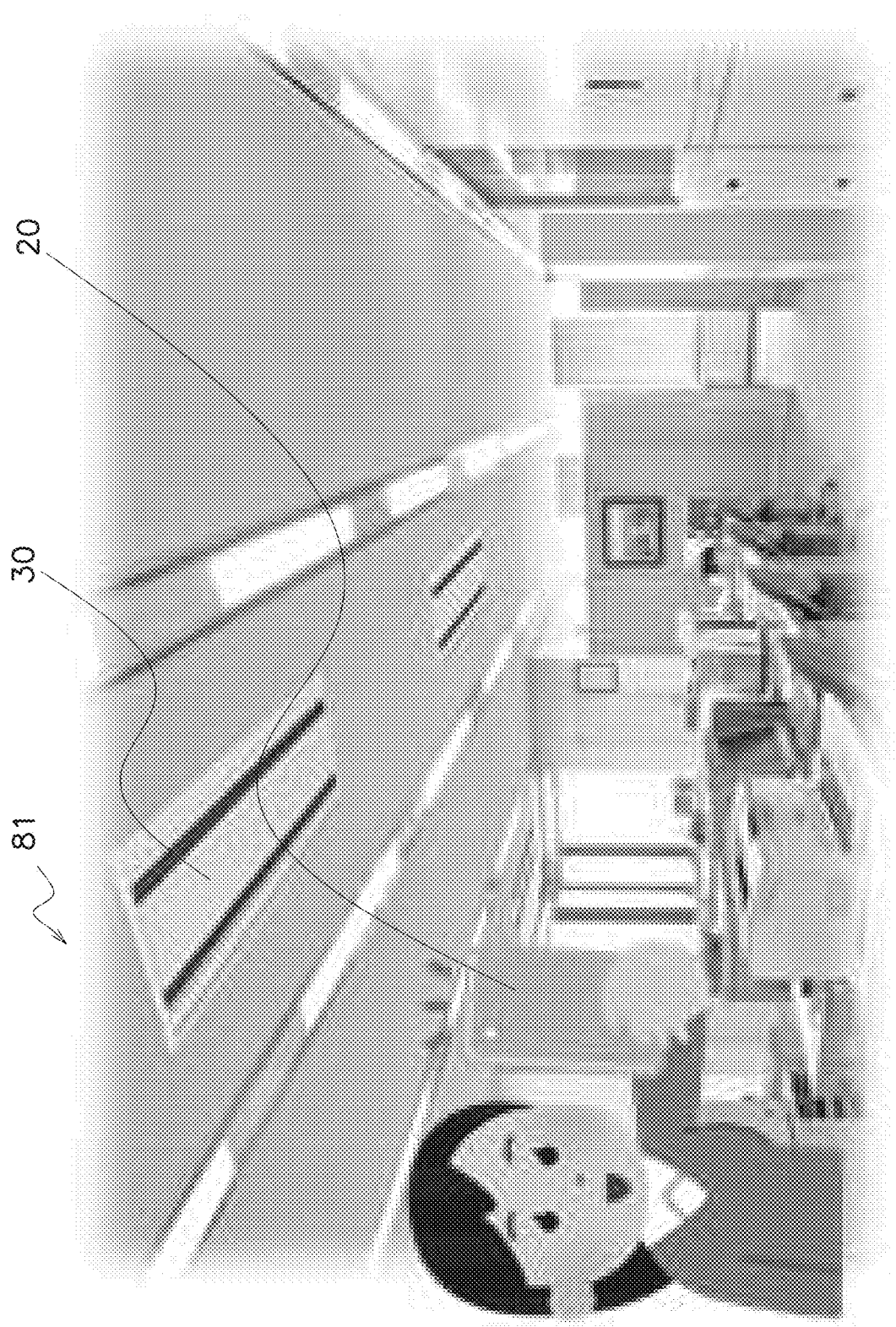
FIG. 1A is a schematic diagram of an air conditioning control system.

Hereinafter, the same environmental state 41 may be represented by different expressions, for example, an environmental state (AR) 41A, an environmental state (CFD) 41C, and an environmental state (environmental distribution diagram) 41F. The environmental state 41 is the state of temperature, humidity, or the like of a space serving as a target of air conditioning performed by an air conditioning apparatus 30. The environmental state (AR) 41A is the environmental state 41 that is represented as visualized information for augmented reality (AR). The environmental state (CFD) 41C is the environmental state 41 that is simulated and represented as computational fluid dynamics (CFD) data. The environmental state (environmental distribution diagram) 41F is the environmental state 41 that represented as image data of an environmental distribution diagram. The details of the above will be described below.

The environmental state 41 with "target" or the like attached to the top, such as a target environmental state 41T, indicates that the former is a broader concept of the latter.

Overall Configuration

An air conditioning control system 100 transmits control content 42 to the air conditioning apparatus 30 and adjusts the environmental state 41 in a target space 81 of an air conditioning operation performed by the air conditioning apparatus 30. The control content 42 is an air conditioning control parameter including an amount regarding at least one of temperature, humidity, air flow direction, air volume, and air velocity. The target space 81 is, for example, an office in a building. The environmental state 41 is an environmental parameter at one or more locations in the target space 81. The environmental parameter includes an amount regarding at least one of temperature, humidity, air flow direction, air volume, and air velocity.

In the present embodiment, the air conditioning control system 100 adjusts the environmental state 41 particularly in a partial space 81a, which is a part of the target space 81. The partial space 81a in the present embodiment is a predetermined two-dimensional region in the target space 81. In the present embodiment, the predetermined two-dimensional region is a plane at a predetermined height in the target space 81. However, the predetermined two-dimensional region is not limited thereto and may be any region.

Figure 2:
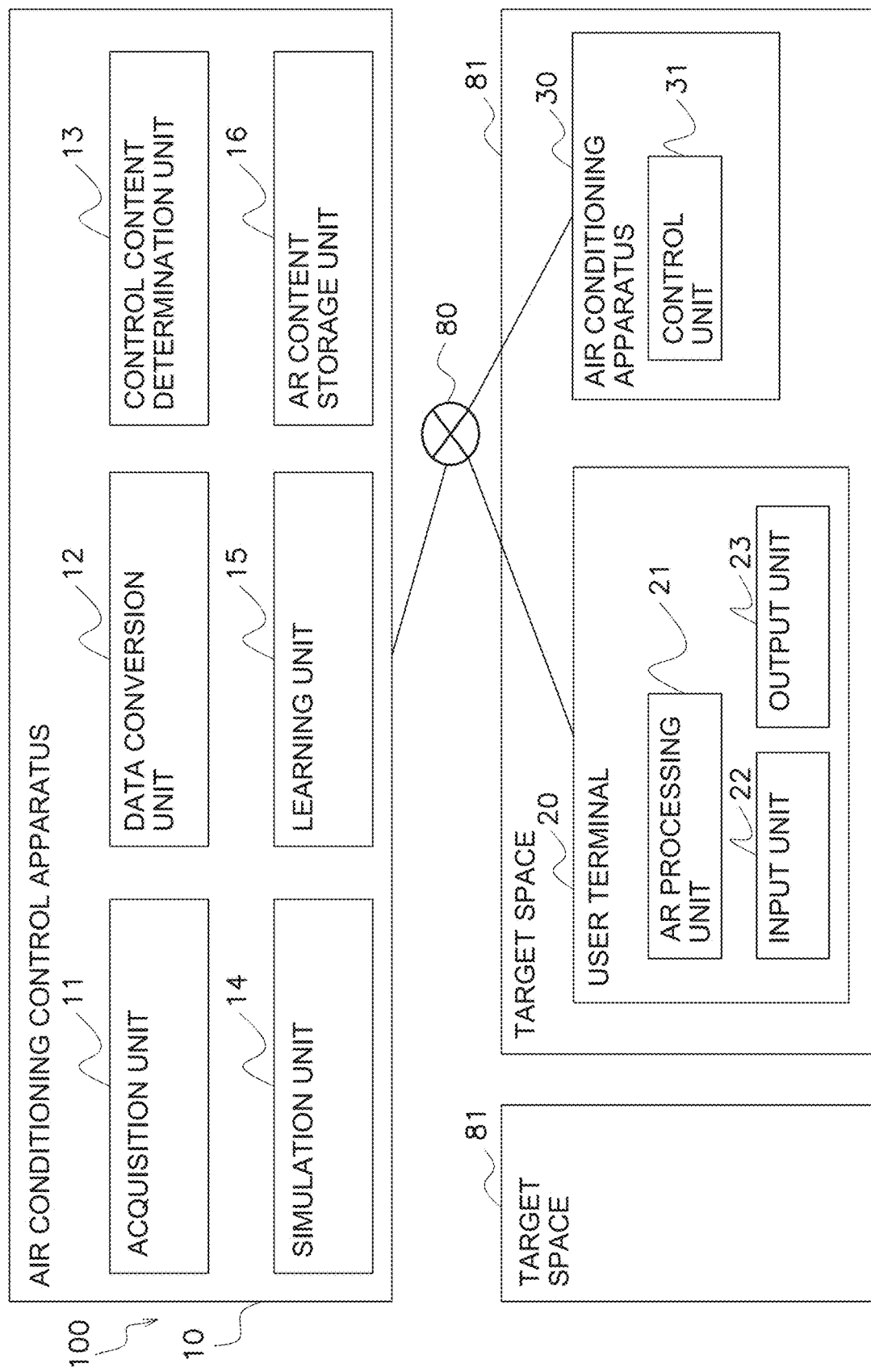
FIG. 2 is a configuration diagram of the air conditioning control system.

As illustrated in FIG. 2, the air conditioning control system 100 mainly includes an air conditioning control apparatus 10.

Figure 1B:
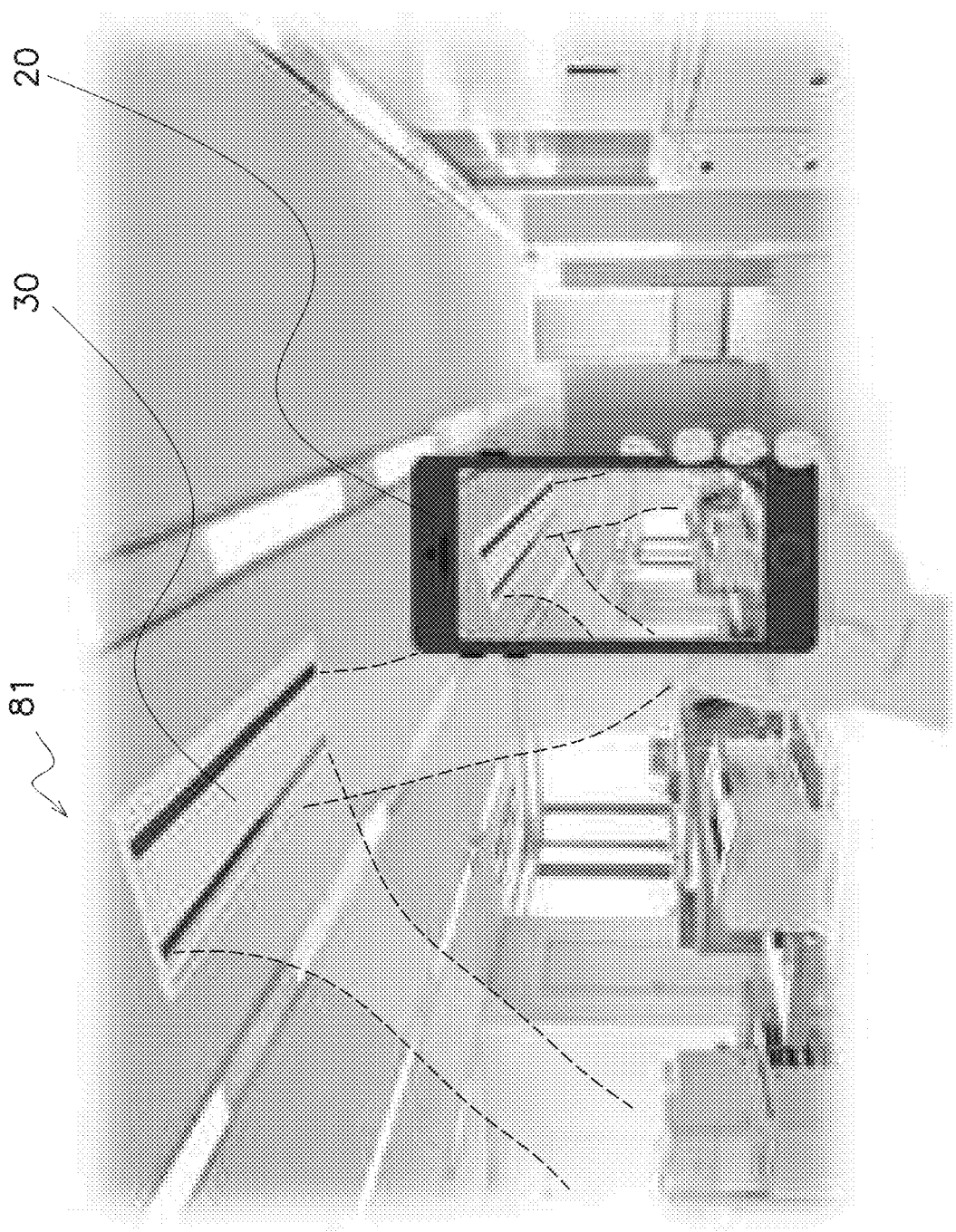
FIG. 1B is a schematic diagram of the air conditioning control system.
Figure 1C:
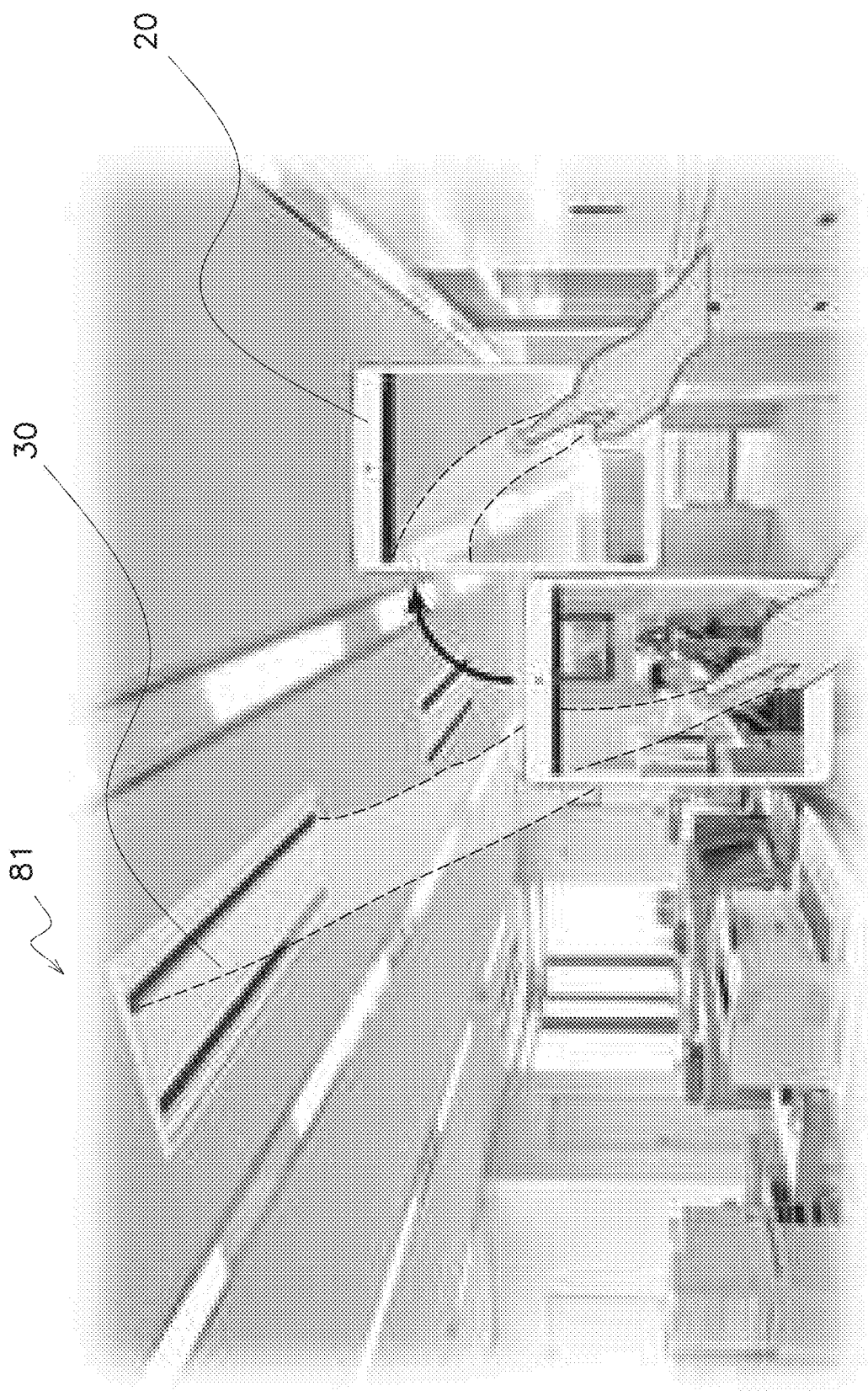
FIG. 1C is a schematic diagram of the air conditioning control system.
Figure 1D:
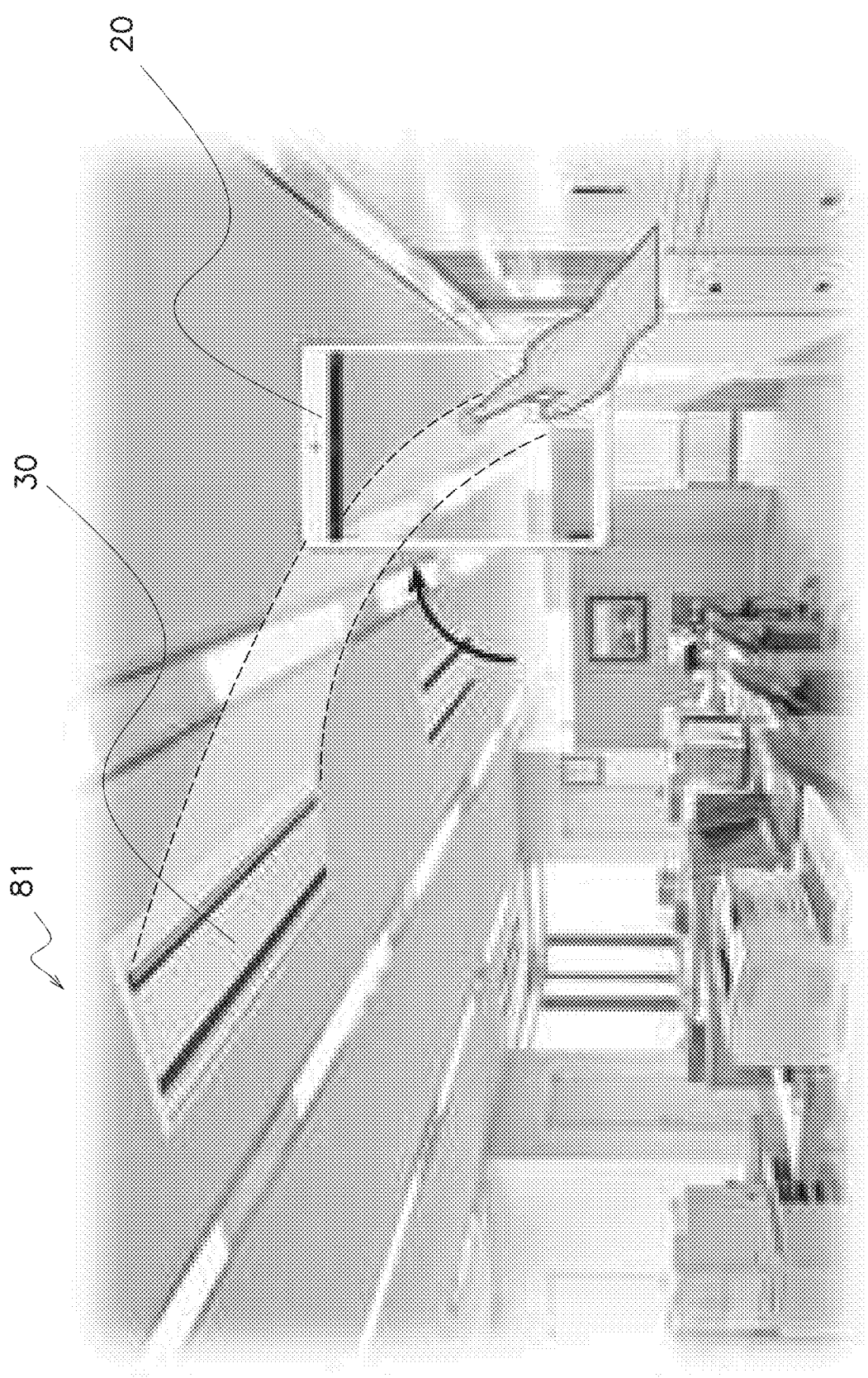
FIG. 1D is a schematic diagram of the air conditioning control system.

FIG. 1A to FIG. 1D are schematic diagrams of the air conditioning control system 100. As illustrated in FIG. 1A, a user starts up an AR application installed in a user terminal 20 and directs the camera of the user terminal 20 toward the target space 81. Accordingly, as illustrated in FIG. 1B, the environmental state 41 visualized by AR is displayed on the screen of the user terminal 20. In FIG. 1B, air blown out of the air conditioning apparatus 30 is displayed. As illustrated in FIG. 1C and FIG. 1D, the user slides his/her finger on the screen of the user terminal 20, for example, thereby changing the direction of the displayed air to a desired air flow direction. Accordingly, the air conditioning control apparatus 10 determines the control content 42 of the air conditioning apparatus 30 so that the air flow direction changed by the user is implemented, and transmits the control content 42 to the air conditioning apparatus 30. As a result, the direction of the air blown out of the air conditioning apparatus 30 changes to the air flow direction changed by the user on the screen.

Figure 3A:
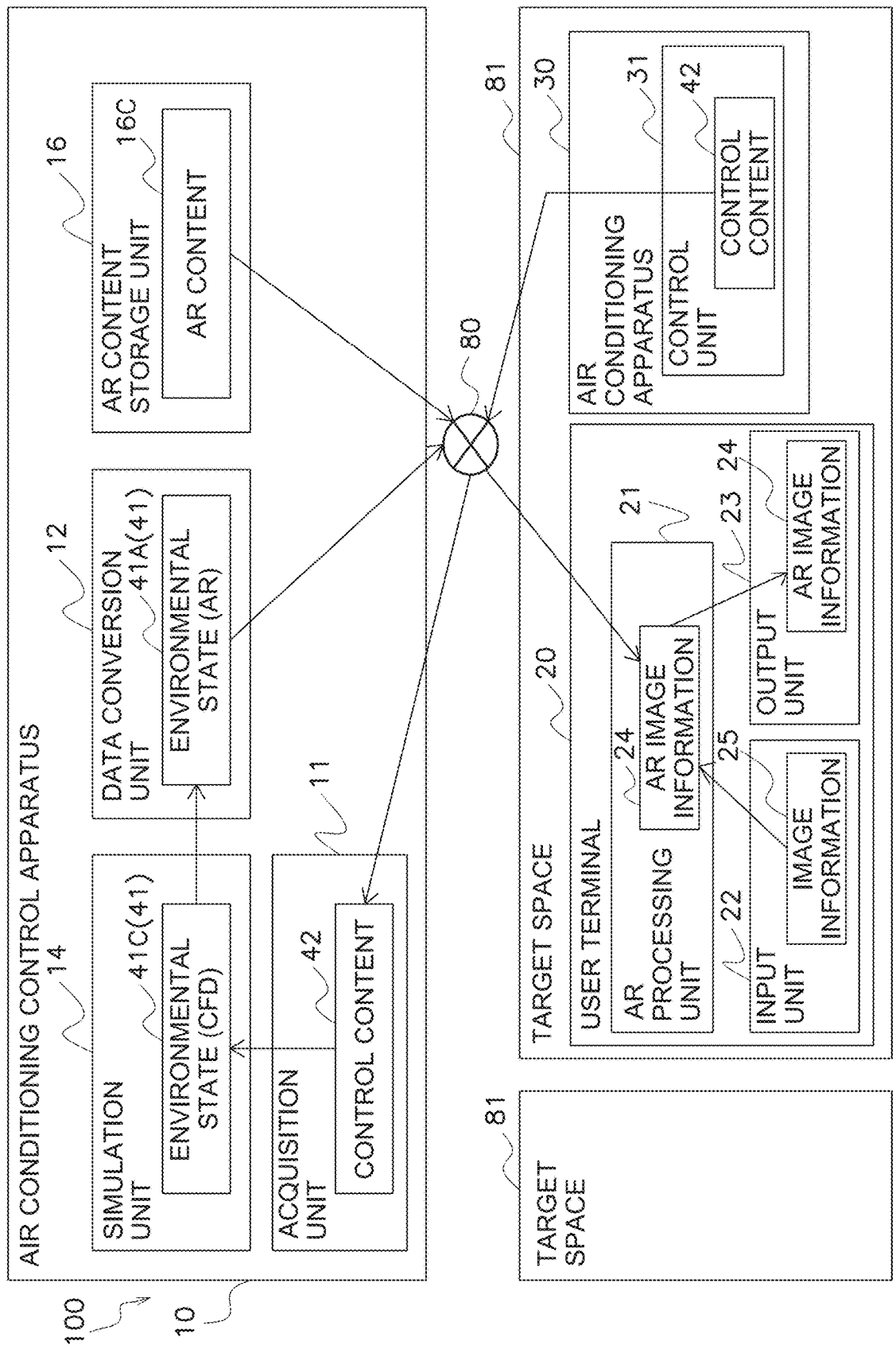
FIG. 3A is a configuration diagram of an environmental state display process.
Figure 3B:
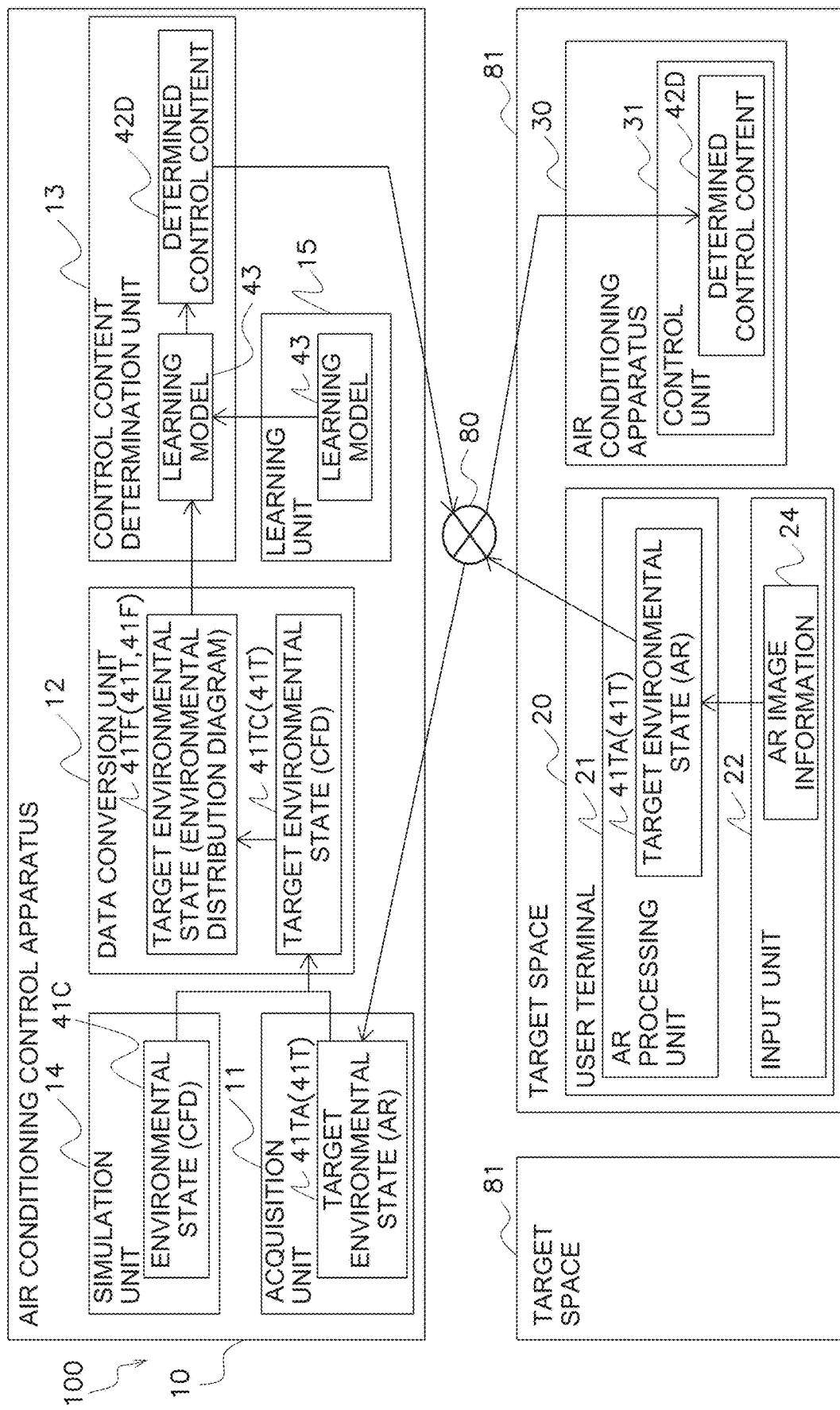
FIG. 3B is a configuration diagram of a control content change process.
Figure 3C:
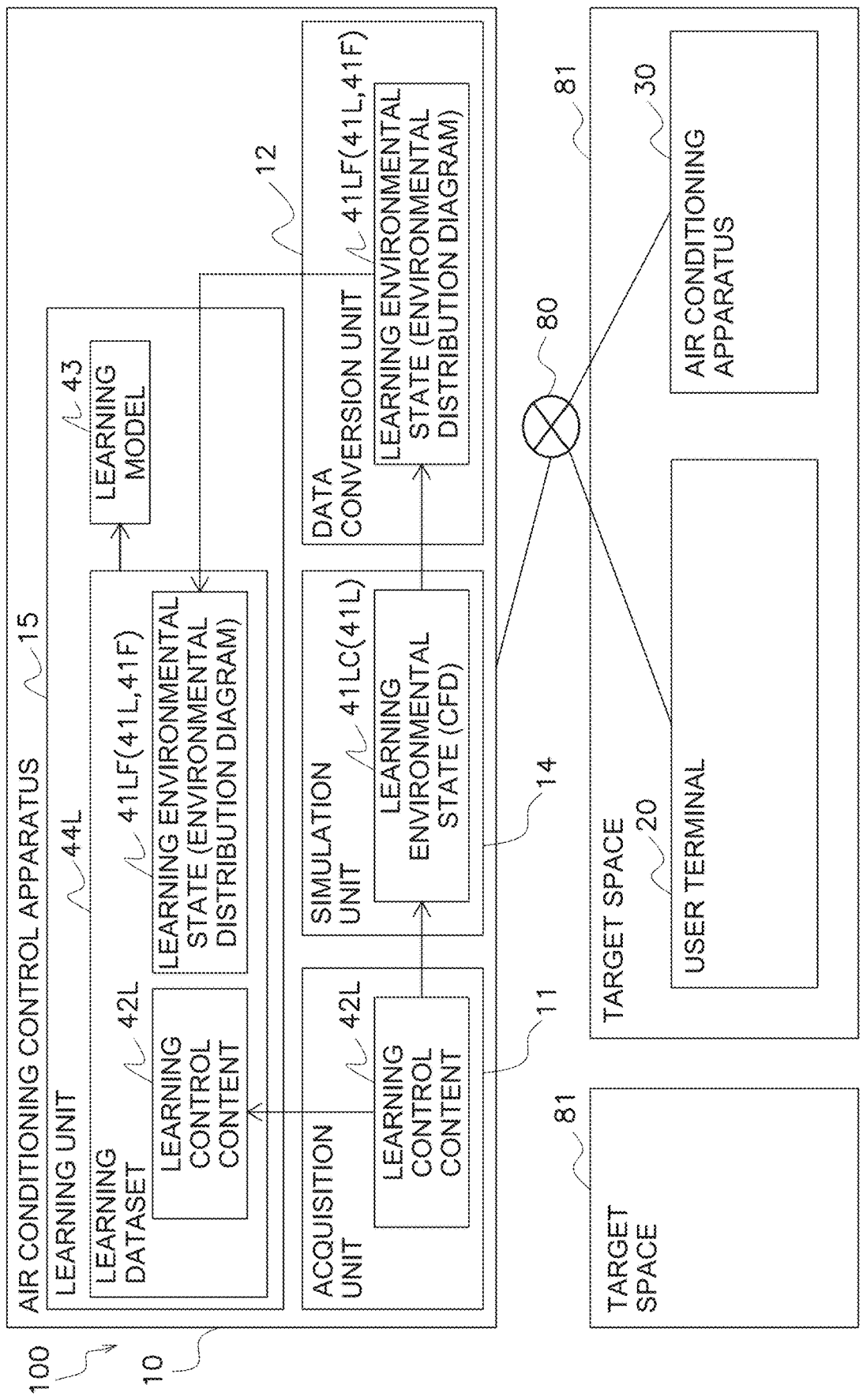
FIG. 3C is a configuration diagram of a learning process.

The air conditioning control system 100 according to the present embodiment performs an environmental state display process, a control content change process, and a learning process. The environmental state display process is a process of displaying the environmental state 41 in the target space 81 on the screen of the user terminal 20 on the basis of the control content 42 of the air conditioning apparatus 30. FIG. 3A illustrates a configuration diagram of the environmental state display process. The control content change process is a process of changing the control content 42 of the air conditioning apparatus 30 so as to bring the target space 81 into the environmental state 41 desired by the user. FIG. 3B illustrates a configuration diagram of the control content change process. The learning process is a process of creating a learning model 43 that is to be used in the control content change process and that determines the control content 42 of the air conditioning apparatus 30. FIG. 3C illustrates a configuration diagram of the learning process. These processes will be described in detail in "(3) Processes".

(2) Detailed Configuration
(2-1) Air Conditioning Control Apparatus

As illustrated in FIG. 2, the air conditioning control apparatus 10 mainly includes an acquisition unit 11, a data conversion unit 12, a control content determination unit 13, a simulation unit 14, a learning unit 15, and an AR content storage unit 16. The air conditioning control apparatus 10 also includes a control processing device and a storage device. As the control processing device, a processor such as a CPU or a GPU may be used. The control processing device reads out a program stored in the storage device and performs predetermined image processing or computation processing in accordance with the program. Furthermore, the control processing device is capable of writing a computation result in the storage device and reading out information stored in the storage device in accordance with the program. The acquisition unit 11, the data conversion unit 12, the control content determination unit 13, the simulation unit 14, the learning unit 15, and the AR content storage unit 16 illustrated in FIG. 2 are various functional blocks implemented by the control processing device.

The air conditioning control apparatus 10 is connected to the user terminal 20 and the air conditioning apparatus 30 via a communication network 80, such as the Internet. In the present embodiment, it is assumed that the air conditioning control apparatus 10 is in a cloud. However, the air conditioning control apparatus 10 may be in the target space 81, and the position thereof is not limited.

(2-1-1) Acquisition Unit

In the environmental state display process illustrated in FIG. 3A, the acquisition unit 11 acquires the control content 42 from the air conditioning apparatus 30. FIG. 4 illustrates an example of the control content 42. In FIG. 4, "20° C." is stored as "temperature", "50%" is stored as "humidity", and so forth. As "air volume" and "air velocity", values representing the respective magnitudes in five stages are stored. In a case where there are a plurality of air conditioning apparatuses 30 in the target space 81, the acquisition unit 11 acquires pieces of control content 42 for the plurality of air conditioning apparatuses 30.

In the control content change process illustrated in FIG. 3B, the acquisition unit 11 acquires a target environmental state 41T, which is the environmental state 41 to be achieved, from the user terminal 20. The environmental state 41 to be achieved is the environmental state 41 that is designated by the user on the screen of the user terminal 20 and that is desired by the user. In the present embodiment, the target environmental state 41T is the environmental state 41 to be achieved in a plane at a predetermined height in the target space 81. In the present embodiment, the acquisition unit 11 acquires the target environmental state 41T as a target environmental state (AR) 41TA, which is visualized information for AR.

In the learning process illustrated in FIG. 3C, the acquisition unit 11 acquires learning control content 42L. The learning control content 42L is used as an objective variable of the learning model 43. FIG. 5 illustrates an example of the learning control content 42L. The learning control content 42L is data of a combination of various values of temperature, humidity, and so forth that can be taken as set values by the air conditioning apparatus 30. In a case where there are a plurality of air conditioning apparatuses 30 in the target space 81, the acquisition unit 11 acquires pieces of learning control content 42L for the plurality of air conditioning apparatuses 30. The acquisition unit 11 acquires the learning control content 42L from, for example, a CSV file, a DB server, or the like.

(2-1-2) Simulation Unit

Figure 6:
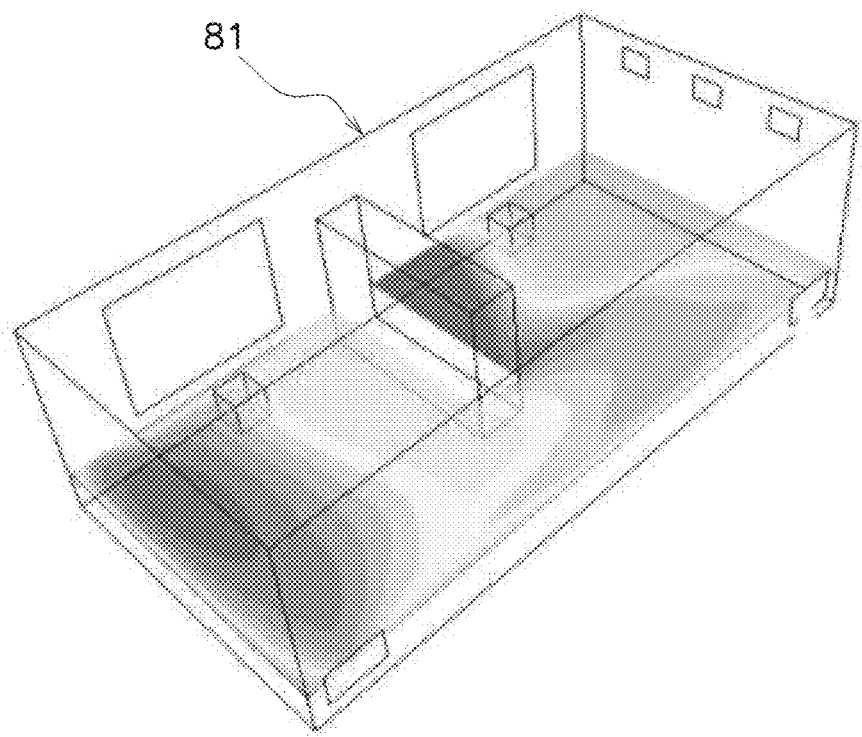
FIG. 6 is a diagram illustrating a temperature distribution in a target space visualized by using an environmental state (CFD).

In the environmental state display process illustrated in FIG. 3A, the simulation unit 14 simulates the environmental state 41 in the target space 81 on the basis of the control content 42 of the air conditioning apparatus 30 acquired by the acquisition unit 11. The simulation unit 14 outputs environmental state (CFD) 41C as a result of the simulation. The environmental state (CFD) 41C is simulation data about environmental parameters at individual coordinate points in the target space 81. FIG. 6 illustrates an example in which the temperature distribution in the target space 81 is visualized by using the environmental state (CFD) 41C. FIG. 6 illustrates the temperature distribution in a plane at a height of 1 m from the ground in the target space 81. In FIG. 6, a portion having a high color density indicates a portion having a high temperature.

In the learning process illustrated in FIG. 3C, the simulation unit 14 simulates the environmental state 41 in the target space 81 on the basis of the learning control content 42L acquired by the acquisition unit 11. As illustrated in FIG. 5, the learning control content 42L is constituted by a plurality of sets of control content 42. Thus, the simulation unit 14 simulates the environmental state 41 in the target space 81 with respect to each set of the control content 42. The learning environmental state 41L is an output result of one or more simulations performed by using the learning control content 42L as an input. In the present embodiment, the learning environmental state 41L is the environmental state 41 in a plane at a predetermined height in the target space 81. The simulation unit 14 outputs a learning environmental state (CFD) 41LC as a result of the simulation. The learning environmental state (CFD) 41LC is constituted by a plurality of pieces of CFD data corresponding to individual simulations.

The above-described simulation is performed by using, for example, existing general-purpose simulation software.

(2-1-3) Data Conversion Unit

In the environmental state display process illustrated in FIG. 3A, the data conversion unit 12 converts the environmental state (CFD) 41C output by the simulation unit 14 into environmental state (AR) 41A, which is visualized information for AR.

In the control content change process illustrated in FIG. 3B, the data conversion unit 12 creates a target environmental state (CFD) 41TC by using the target environmental state (AR) 41TA acquired by the acquisition unit 11 and the environmental state (CFD) 41C output by the simulation unit 14 in the environmental state display process. The target environmental state (AR) 41TA is visualized information for AR that reflects the environmental state 41 desired by the user. The environmental state (CFD) 41C is the environmental state 41 in which a desire of the user is not reflected before the user operates the screen of the user terminal 20. The data conversion unit 12 updates the environmental state (CFD) 41C by using the target environmental state (AR) 41TA, thereby creating the target environmental state (CFD) 41TC, which is the environmental state 41 desired by the user.

In a case where the acquisition unit 11 acquires a plurality of target environmental states (AR) 41TA from a plurality of user terminals 20 within a relatively short time, for example, 5 seconds or less, the data conversion unit 12 may determine one target environmental state (AR) 41TA from among these target environmental states (AR) 41TA by using a predetermined method.

For example, it is assumed that one user designates the temperature of a place A in the target space 81 as 20° C. and that another user designates the temperature of the same place A as 22° C. In such a case where a plurality of target environmental states (AR) 41TA compete with each other, for example, the plurality of target environmental states (AR) 41TA may be averaged to determine one target environmental state (AR) 41TA. In the above-described example, the target environmental state (AR) 41TA in which the temperature of the place A is 21° C. is determined. For example, it is assumed that one user designates the temperature of the place A in the target space 81 as 20° C. and that another user designates the temperature of a place B different from the place A as 22° C. In such a case where a plurality of target environmental states (AR) 41TA do not compete with each other, for example, the target environmental states (AR) 41TA that faithfully reflects the desires of the respective users may be determined. In the above-described example, the target environmental state (AR) 41TA in which the temperature of the place A is 20° C. and the temperature of the place B is 22° C. is determined.

Figure 7A:
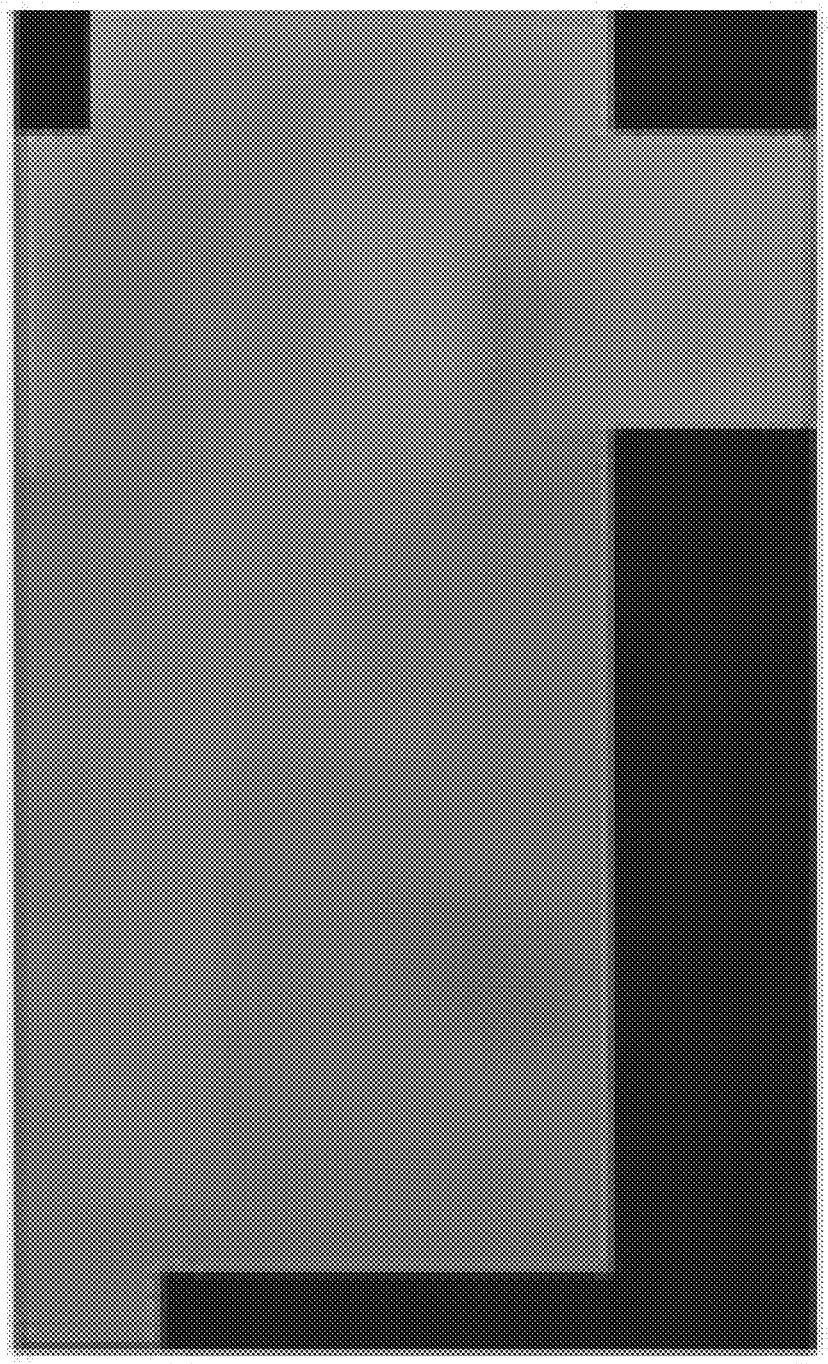
FIG. 7A illustrates an environmental distribution diagram of temperature.
Figure 7B:
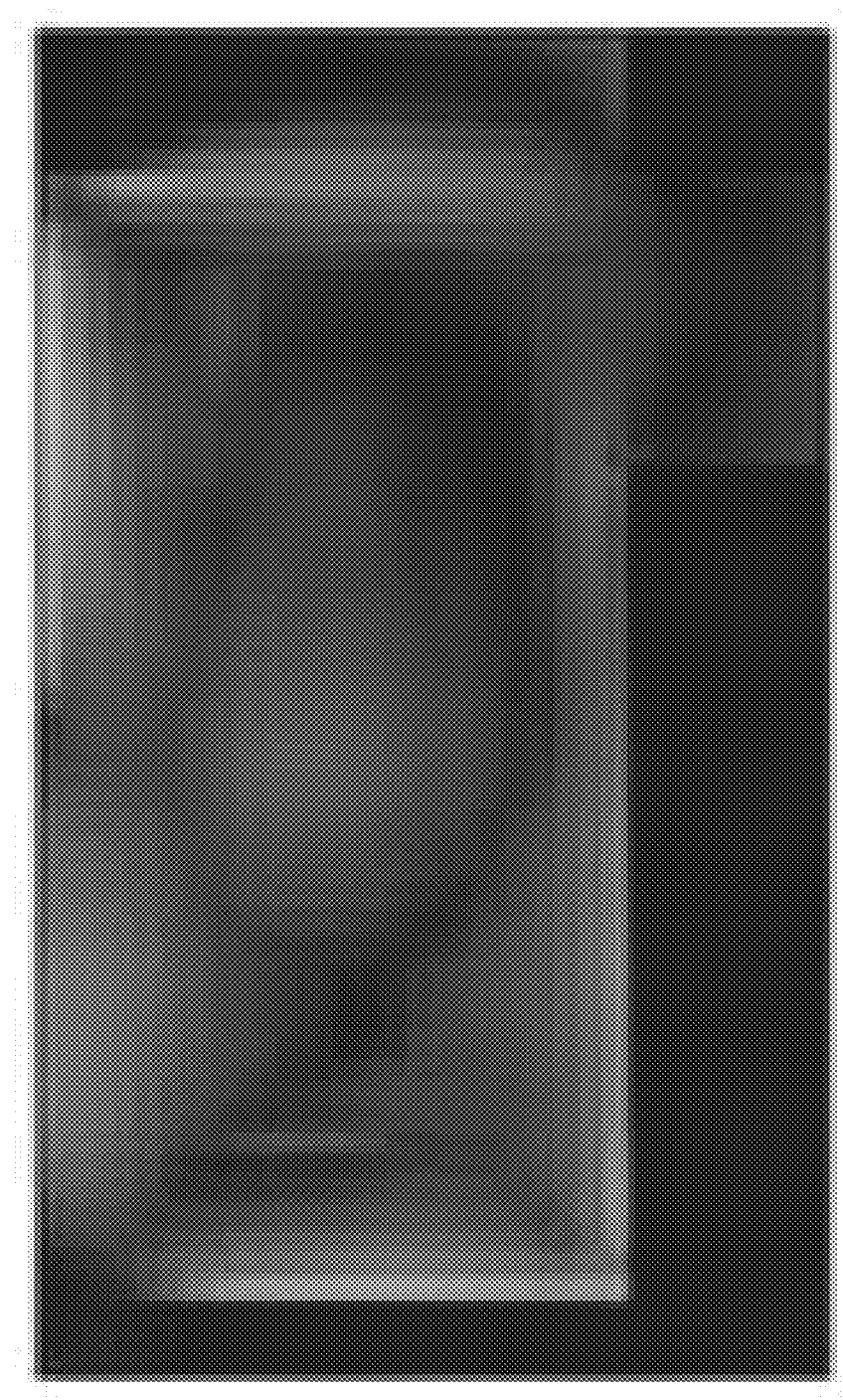
FIG. 7B illustrates an environmental distribution diagram of air velocity.

The data conversion unit 12 further converts the target environmental state (CFD) 41TC into a target environmental state (environmental distribution diagram) 41TF. The environmental distribution diagram according to the present embodiment is an image of a temperature distribution or the like in a plane at a predetermined height in the target space 81. The environmental distribution diagram is created for each of environmental parameters, such as temperature and humidity. For example, in the case of an environmental distribution diagram of temperature, the data conversion unit 12 acquires, from the target environmental state (CFD) 41TC, a temperature distribution in the plane at the predetermined height in the target space 81. The data conversion unit 12 normalizes the acquired temperature distribution in the plane and images the temperature distribution. The normalization is a process of converting temperatures corresponding to individual pixels into numerical values from 0 to 1. For example, in a case where the maximum temperature in the temperature distribution is 25° C. and the minimum temperature therein is 20° C., values obtained by subtracting 20° C. from the temperatures of the individual pixels are divided by 5° C., which is obtained by subtracting 20° ° C. from 25° C., and then the temperature values of the individual pixels become values from 0 to 1. Imaging is a visualization process of assigning, to the individual pixels, light or shade corresponding to the magnitudes of the normalized numerical values. FIG. 7A illustrates an example of an environmental distribution diagram of temperature in a plane at a height of 1 m from the ground in the target space 81. FIG. 7B illustrates an example of an environmental distribution diagram of air velocity created in a similar manner. The data conversion unit 12 outputs, as the target environmental state (environmental distribution diagram) 41TF, a plurality of environmental distribution diagrams corresponding to the individual environmental parameters created from the target environmental state (CFD) 41TC. Hereinafter, a plurality of environmental distribution diagrams created from one piece of CFD data will be referred to as one set of environmental distribution diagrams.

In the learning process illustrated in FIG. 3C, the data conversion unit 12 converts the learning environmental state (CFD) 41LC output by the simulation unit 14 into a learning environmental state (environmental distribution diagram) 41LF. As described above, the learning environmental state (CFD) 41LC is constituted by a plurality of pieces of CFD data, and thus the learning environmental state (environmental distribution diagram) 41LF is constituted by a plurality of sets of environmental distribution diagrams. The learning environmental state (environmental distribution diagram) 41LF is used as an explanatory variable of the learning model 43.

Data conversion may be performed by using, for example, a function of simulation software that creates CFD data, or may be performed by using a programming language, such as Python or R.

(2-1-4) Control Content Determination Unit

The control content determination unit 13 has the learning model 43 having an input, which is the target environmental state 41T, and an output, which is determined control content 42D, which is the control content 42 to be transmitted to the air conditioning apparatus 30 for bringing the target space 81 closer to the target environmental state 41T. Specifically, in the control content change process illustrated in FIG. 3B, the control content determination unit 13 calculates the determined control content 42D from the target environmental state (environmental distribution diagram) 41TF by using the learning model 43 acquired from the learning unit 15. In the present embodiment, the determined control content 42D is the control content 42 to be transmitted to the air conditioning apparatus 30 for bringing a plane at a predetermined height in the target space 81 closer to the target environmental state 41T.

The calculation using the learning model 43 is performed by, for example, a function of a machine learning platform that has created the learning model 43, or the like.

(2-1-5) Learning Unit

The learning unit 15 creates the learning model 43. The learning model 43 has been trained by using, as a learning dataset 44L, the learning control content 42L, which is the control content 42 for the air conditioning apparatus 30, and the learning environmental state 41L, which is the environmental state 41 in the target space 81. Specifically, in the learning process illustrated in FIG. 3C, the learning unit 15 acquires the learning control content 42L from the acquisition unit 11 and acquires the learning environmental state (environmental distribution diagram) 41LF from the data conversion unit 12. The learning unit 15 creates the learning model 43 by using the learning environmental state (environmental distribution diagram) 41LF as an explanatory variable and using the learning control content 42L as an objective variable.

Figure 9:
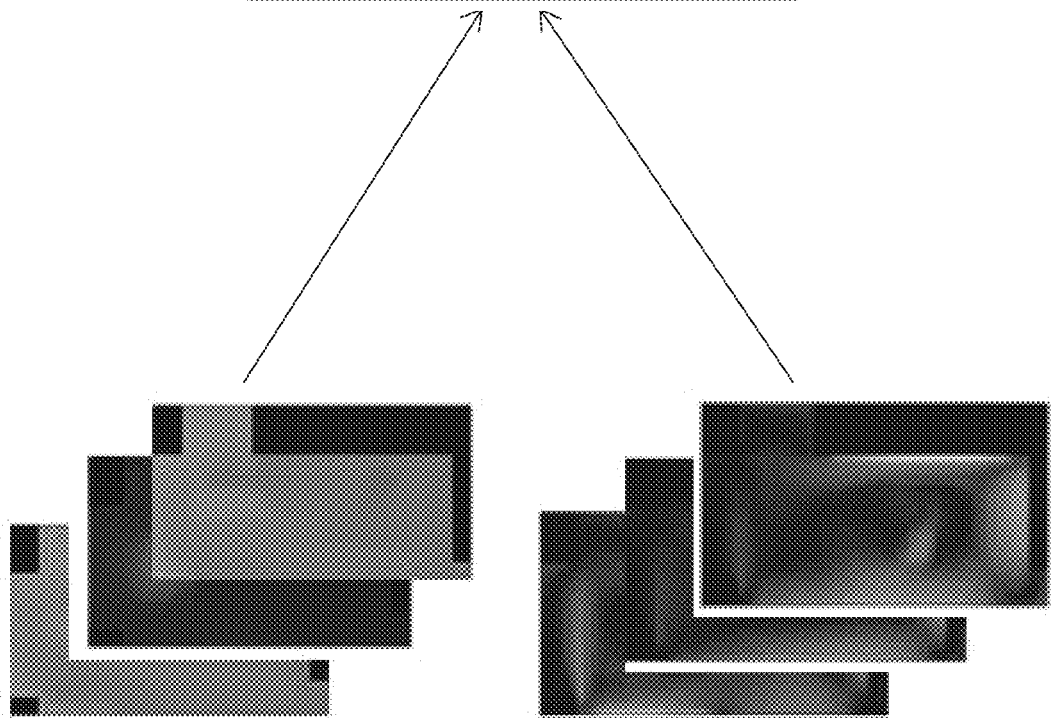
FIG. 9 is a schematic diagram of a learning dataset.

The learning procedure will be specifically described. Here, a description will be given of a case where there is one air conditioning apparatus 30 in the target space 81. However, there may be a plurality of air conditioning apparatuses 30 in the target space 81. It is assumed that the air conditioning control parameters constituting the control content 42 of the air conditioning apparatus 30 are temperature, air volume, and air flow direction. It is assumed that the image size of an environmental distribution diagram is 16 (vertical pixels)×8 (horizontal pixels). FIG. 9 illustrates an overview of the learning dataset 44L. FIG. 9 illustrates two pieces of learning data. The left side in FIG. 9 illustrates the learning environmental state (environmental distribution diagram) 41LF serving as an explanatory variable of the learning model 43. Here, two sets of environmental distribution diagrams are illustrated. Because there are three air conditioning control parameters constituting the control content 42, one set of environmental distribution diagrams is constituted by three environmental distribution diagrams as described in "(2-1-3) Data Conversion Unit". The right side in FIG. 9 illustrates the learning control content 42L serving as an objective variable of the learning model 43.

Figure 10:
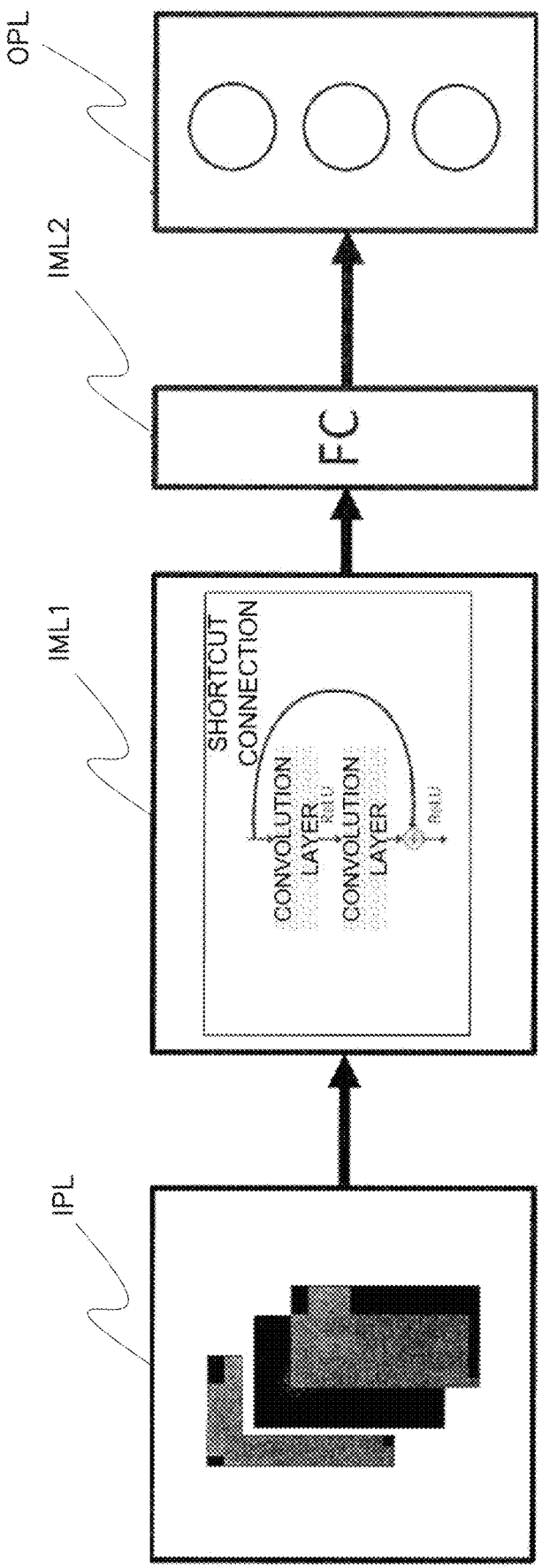
FIG. 10 is an overall diagram of a ResNet.

In the present embodiment, a regression model based on a convolutional neural network (hereafter abbreviated as CNN) is used as the learning model 43. Furthermore, a residual network (ResNet) is used as the CNN. FIG. 10 illustrates an overall view of the ResNet. The ResNet in FIG. 10 is constituted by an input layer IPL, an intermediate layer IML, and an output layer OPL.

As illustrated in FIG. 10, image data of environmental distribution diagrams is input to the input layer IPL of the ResNet. The input layer IPL of the ResNet is configured to be able to receive a three-dimensional array of (vertical pixels of an environmental distribution diagram)×(horizontal pixels of an environmental distribution diagram)×(the number of environmental distribution diagrams constituting one set of environmental distribution diagrams). This is for inputting one set of environmental distribution diagrams at one time. Here, a three-dimensional array of 16 (vertical pixels)×8 (horizontal pixels)×3 (the number of environmental distribution diagrams) is input to the input layer IPL.

The intermediate layer IML1 of the ResNet is constituted by a residual block illustrated in FIG. 10. The residual block is constituted by a plurality of convolution layers and a shortcut connection. In the calculation in the residual block in FIG. 10, an activation function is caused to act on the sum of an input to the upper convolution layer and an output from the lower convolution layer. As the activation function, a rectified linear unit (ReLU) function is used.

As illustrated in FIG. 10, the intermediate layer IML2 of the ResNet is a fully connected layer (FC layer). As the activation function, a ReLU function is used.

The control content 42 of the air conditioning apparatus 30 is output to the output layer OPL of the ResNet. To the output layer OPL of the CNN, a vector having dimensions of (the number of air conditioning control parameters constituting the control content 42)×(the number of air conditioning apparatuses 30) is output. Here, in accordance with 3 (the number of air conditioning control parameters)×1 (the number of apparatuses), a three-dimensional vector is output to the output layer OPL. To the three nodes (circles) illustrated in the output layer OPL in FIG. 10, a predicted temperature value, a predicted air volume value, and a predicted air flow direction value are output in this order from above.

As a loss function of the ResNet, for example, a mean squared error or the like is used.

The ResNet is optimized by using, for example, stochastic gradient descent or the like.

In the present embodiment, a ResNet is created as the learning model 43. However, the learning model 43 may be a CNN having another configuration, an ordinary neural network, or the like. The learning model 43 is created by using, for example, a cloud machine learning platform or the like.

(2-1-6) AR Content Storage Unit

The AR content storage unit 16 stores AR content 16C. The AR content 16C is a part such as an image used in AR. The AR content 16C is, for example, an image of air displayed on the screen of the user terminal 20 as illustrated in FIG. 1B to FIG. 1D.

The AR content 16C is stored in a storage device included in the air conditioning control apparatus 10.

(2-2) User Terminal

As illustrated in FIG. 2, the user terminal 20 mainly includes an AR processing unit 21, an input unit 22, and an output unit 23. The user terminal 20 also includes a control processing device and a storage device. As the control processing device, a processor such as a CPU or a GPU may be used. The control processing device reads out a program stored in the storage device and performs predetermined image processing or computation processing in accordance with the program. Furthermore, the control processing device is capable of writing a computation result in the storage device and reading out information stored in the storage device in accordance with the program. The AR processing unit 21, the input unit 22, and the output unit 23 illustrated in FIG. 2 are various functional blocks implemented by the control processing device. In the present embodiment, it is assumed that the user terminal 20 is a tablet terminal or a smartphone terminal. However, the user terminal 20 may be a PC or the like, and is not limited. The user terminal 20 is connected to the air conditioning control apparatus 10 and the air conditioning apparatus 30 via the communication network 80, such as the Internet. The user terminal 20 is in the target space 81.

(2-2-1) AR Processing Unit

In the environmental state display process illustrated in FIG. 3A, the AR processing unit 21 acquires the environmental state (AR data) 41A and the AR content 16C from the air conditioning control apparatus 10. The AR processing unit 21 also acquires, from the input unit 22, image information 25 in the target space 81. The image information 25 is acquired by the input unit 22 from the camera included in the user terminal 20. The AR processing unit 21 combines these pieces of information to create AR image information 24.

In the control content change process illustrated in FIG. 3B, the AR processing unit 21 acquires, from the input unit 22, the AR image information 24 that reflects the environmental state 41 desired by the user. The AR processing unit 21 extracts, from the AR image information 24, the target environmental state (AR) 41TA, which is visualized information for AR.

The AR processing unit 21 is implemented by, for example, a function of an existing general-purpose AR application. The AR application is used by being installed in the user terminal 20.

(2-2-2) Input Unit

In the environmental state display process illustrated in FIG. 3A, the input unit 22 acquires the image information 25 in the target space 81 from the camera included in the user terminal 20.

In the control content change process illustrated in FIG. 3B, the input unit 22 acquires, from the screen of the user terminal 20, the AR image information 24 that reflects the environmental state 41 desired by the user. The user slides his/her finger on an AR image displayed on the screen of the user terminal 20, thereby designating the environmental state 41 desired by the user. FIG. 1C and FIG. 1D illustrate a state in which the user is operating an AR image indicating an air flow direction with his/her finger. The AR image information 24 acquired by the input unit 22 is processed into the target environmental state (AR) 41TA by the AR processing unit 21. Thus, the target environmental state 41T is determined on the basis of a desire regarding the environmental state 41 input via the screen of the user terminal 20, which is a user interface.

(2-2-3) Output Unit

In the environmental state display process illustrated in FIG. 3A, the output unit 23 acquires the AR image information 24 from the AR processing unit 21 and outputs the AR image information 24 to the screen of the user terminal 20. Accordingly, the user is able to view, on the screen of the user terminal 20, the environmental state 41 in the target space 81 visualized by AR. FIG. 1B illustrates a state in which the environmental state 41 in the target space 81 visualized by AR is displayed on the screen of the user terminal 20.

(2-3) Air Conditioning Apparatus

As illustrated in FIG. 2, the air conditioning apparatus 30 mainly includes a control unit 31. The air conditioning apparatus 30 is connected to the air conditioning control apparatus 10 and the user terminal 20 via the communication network 80, such as the Internet. The air conditioning apparatus 30 is in the target space 81.

(2-3-1) Control Unit

The control unit 31 controls, on the basis of the control content 42, the temperature, humidity, and so forth of air discharged from the air conditioning apparatus 30.

In the environmental state display process illustrated in FIG. 3A, the control unit 31 transmits the control content 42 to the air conditioning control apparatus 10.

In the control content change process illustrated in FIG. 3B, the control unit 31 acquires the determined control content 42D from the air conditioning control apparatus 10. As a result of the control unit 31 controlling the air conditioning apparatus 30 on the basis of the determined control content 42D, the target space 81 is brought into the environmental state 41 desired by the user.

(3) Processes

As described above, the air conditioning control system 100 performs an environmental state display process, a control content change process, and a learning process. Hereinafter, the individual processes will be described in detail.

(3-1) Environmental State Display Process

The environmental state display process is a process of displaying the environmental state 41 in the target space 81 on the screen of the user terminal 20 on the basis of the control content 42 of the air conditioning apparatus 30. The environmental state display process will be described with reference to the flowchart in FIG. 8A and FIG. 8B. The flowchart in FIG. 8A and FIG. 8B basically corresponds to the arrows in FIG. 3A.

Upon startup of the AR application in step S1, the user terminal 20 requests the environmental state (AR) 41A and the AR content 16C to the air conditioning control apparatus 10 in step S2.

In response to receipt of the request from the user terminal 20, the air conditioning control apparatus 10 acquires the control content 42 from the air conditioning apparatus 30 in step S3.

After acquiring the control content 42 from the air conditioning apparatus 30, the air conditioning control apparatus 10 simulates the environmental state 41 in the target space 81 on the basis of the control content 42 and creates the environmental state (CFD) 41C in step S4.

After creating the environmental state (CFD) 41C, the air conditioning control apparatus 10 converts the environmental state (CFD) 41C into the environmental state (AR) 41A in step S5.

After converting the environmental state (CFD) 41C into the environmental state (AR) 41A, the air conditioning control apparatus 10 transmits the environmental state (AR) 41A and the AR content 16C to the user terminal 20 in step S6.

In response to acquisition of the environmental state (AR) 41A and the AR content 16C from the air conditioning control apparatus 10, the user terminal 20 acquires the image information 25 from the camera of the user terminal 20 in step S7.

After acquiring the environmental state (AR) 41A, the AR content 16C, and the image information 25, the user terminal 20 creates the AR image information 24 in step S8.

After creating the AR image information 24, the user terminal 20 displays the AR image information 24 on the screen of the user terminal 20 in step S9.

(3-2) Control Content Change Process

The control content change process is a process of changing the control content 42 of the air conditioning apparatus 30 so as to bring the target space 81 into the environmental state 41 desired by the user. The control content change process will be described with reference to the flowchart in FIG. 8C and FIG. 8D. The flowchart in FIG. 8C and FIG. 8D basically corresponds to the arrows in FIG. 3B. Here, it is assumed that the AR image information 24 is displayed on the screen of the user terminal 20 by the environmental state display process.

In response to an operation performed on the AR image on the screen in step S1, the user terminal 20 acquires the AR image information 24 that reflects the environmental state 41 desired by the user in step S2.

After acquiring the AR image information 24, the user terminal 20 extracts the target environmental state (AR) 41TA from the AR image information 24 in step S3.

After extracting the target environmental state (AR) 41TA, the user terminal 20 transmits the target environmental state (AR) 41TA to the air conditioning control apparatus 10 in step S4.

In response to acquisition of the target environmental state (AR) 41TA, the air conditioning control apparatus 10 creates the target environmental state (CFD) 41TC by using the target environmental state (AR) 41TA and the environmental state (CFD) 41C created in the environmental state display process in step S5.

After creating the target environmental state (CFD) 41TC, the air conditioning control apparatus 10 converts the target environmental state (CFD) 41TC into the target environmental state (environmental distribution diagram) 41TF in step S6.

After acquiring the target environmental state (environmental distribution diagram) 41TF, the air conditioning control apparatus 10 calculates the determined control content 42D by using the learning model 43 in step S7.

After calculating the determined control content 42D, the air conditioning control apparatus 10 transmits the determined control content 42D to the air conditioning apparatus 30 in step S8.

In response to acquisition of the determined control content 42D, the air conditioning apparatus 30 controls the air conditioning apparatus 30 on the basis of the determined control content 42D in step S9.

Figure 8A:
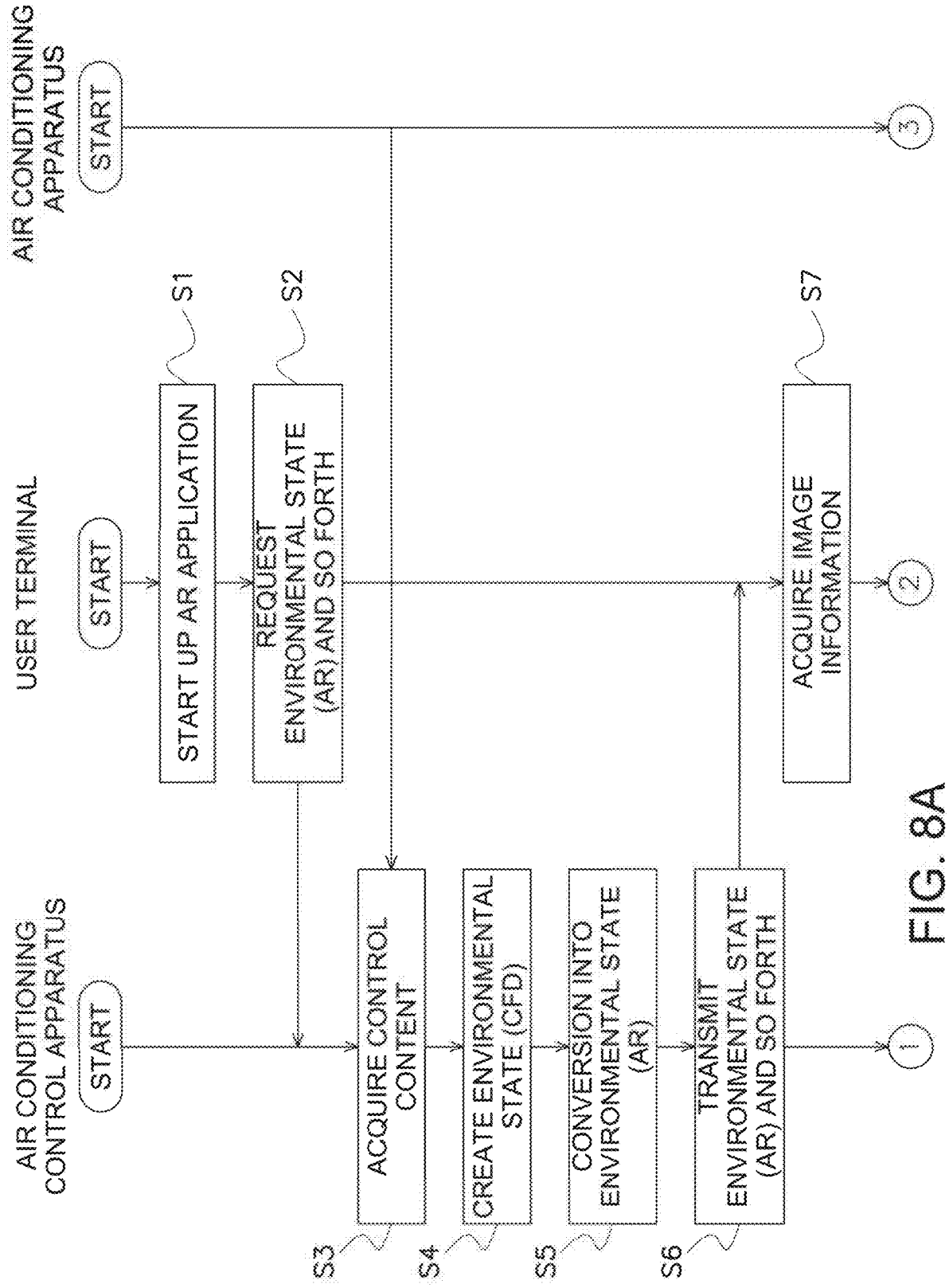
FIG. 8A is a flowchart of an environmental state display process.
Figure 8B:
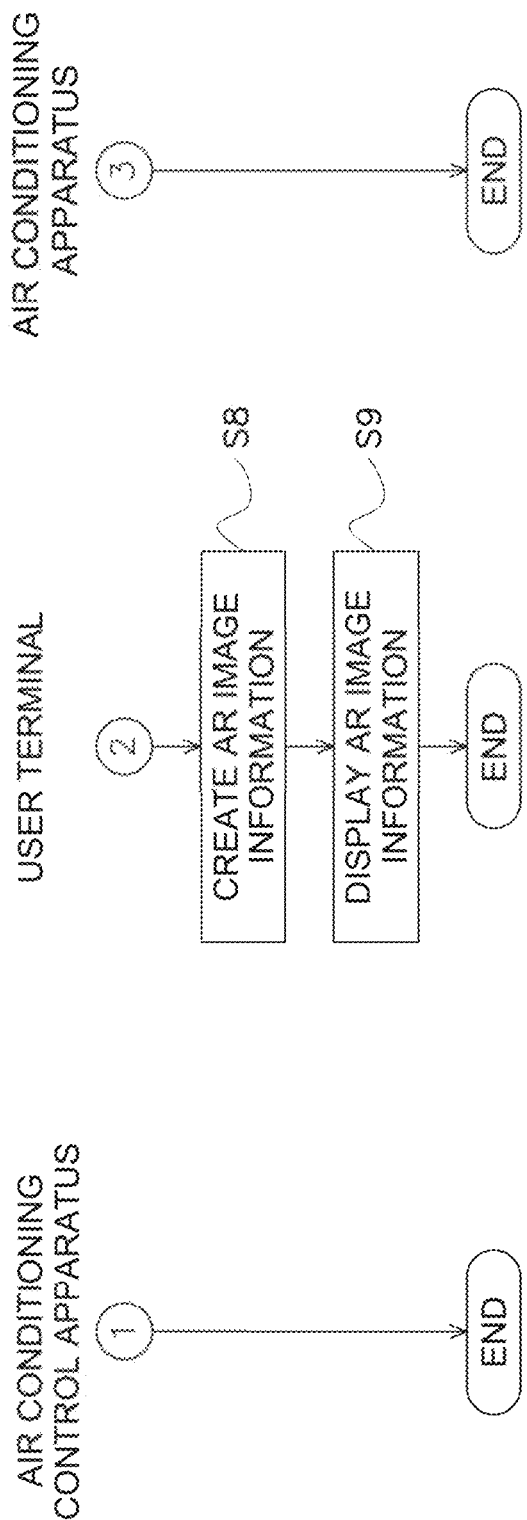
FIG. 8B is the flowchart of the environmental state display process.
Figure 8C:
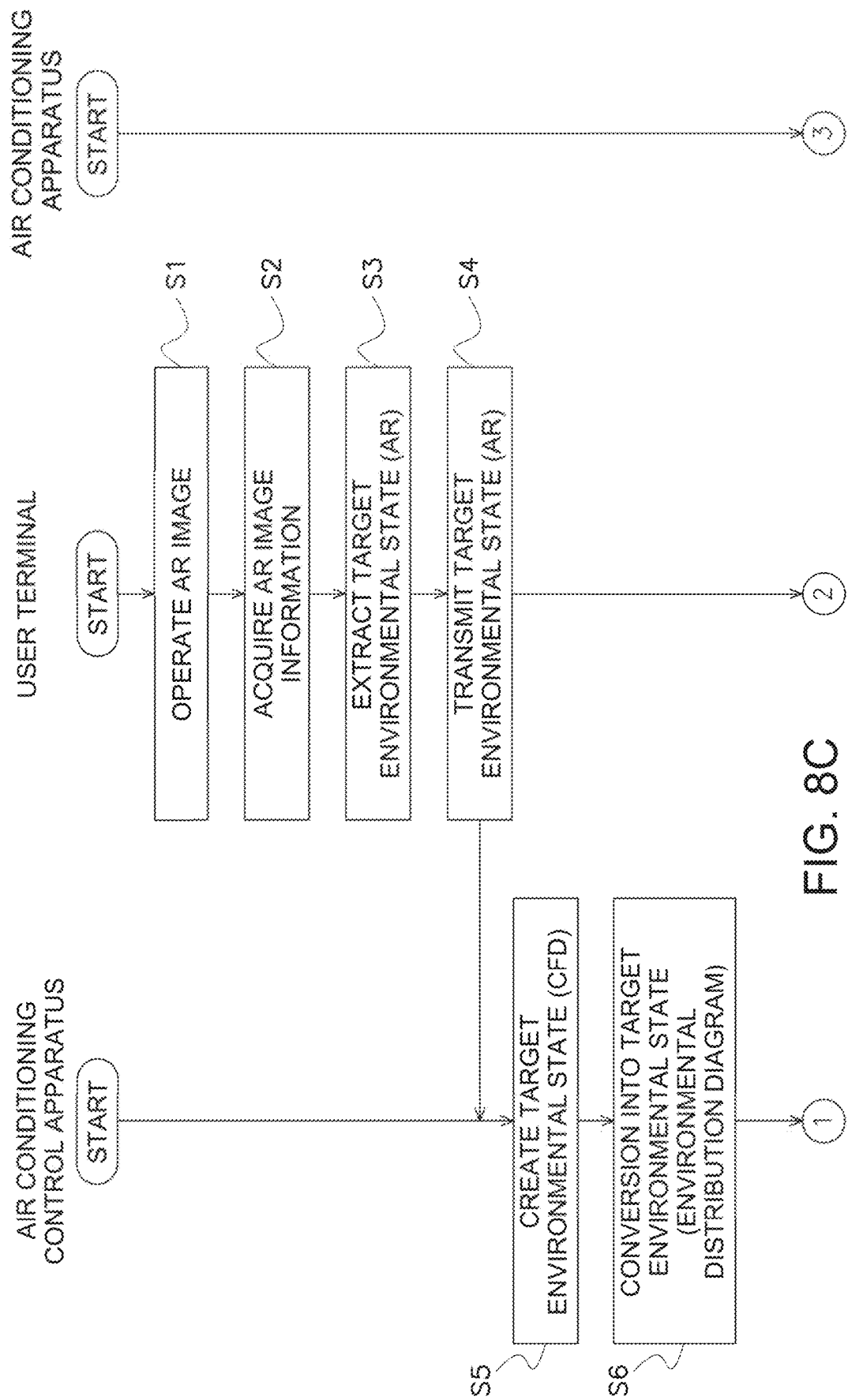
FIG. 8C is a flowchart of a control content change process.
Figure 8D:
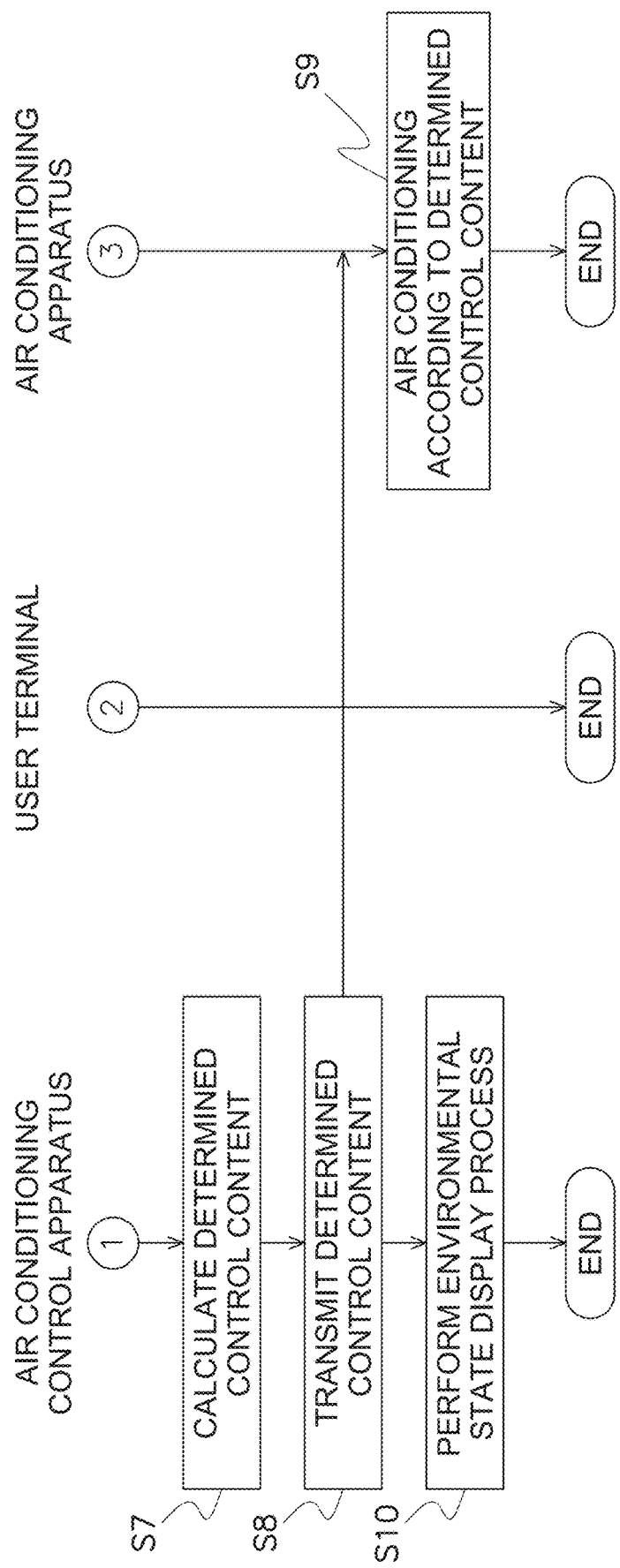
FIG. 8D is the flowchart of the control content change process.

After calculating the determined control content 42D, the air conditioning control apparatus 10 performs an environmental state display process on the basis of the determined control content 42D in step S10. Specifically, step S3 in FIG. 8A is changed to "acquire determined control content 42D", and the environmental state display process is started from step S3. The determined control content 42D is calculated from the screen operated by the user, and thus the screen display is basically the same as the screen display obtained through the environmental state display process performed on the basis of the determined control content 42D. However, the determined control content 42D is predicted by the learning model 43, and thus the two screen displays may be slightly different from each other. It is also necessary to update the environmental state (CFD) 41C of the simulation unit 14 to a state corresponding to the determined control content 42D. Thus, the air conditioning control apparatus 10 performs the environmental state display process on the basis of the determined control content 42D.

(3-3) Learning Process

Figure 8E:
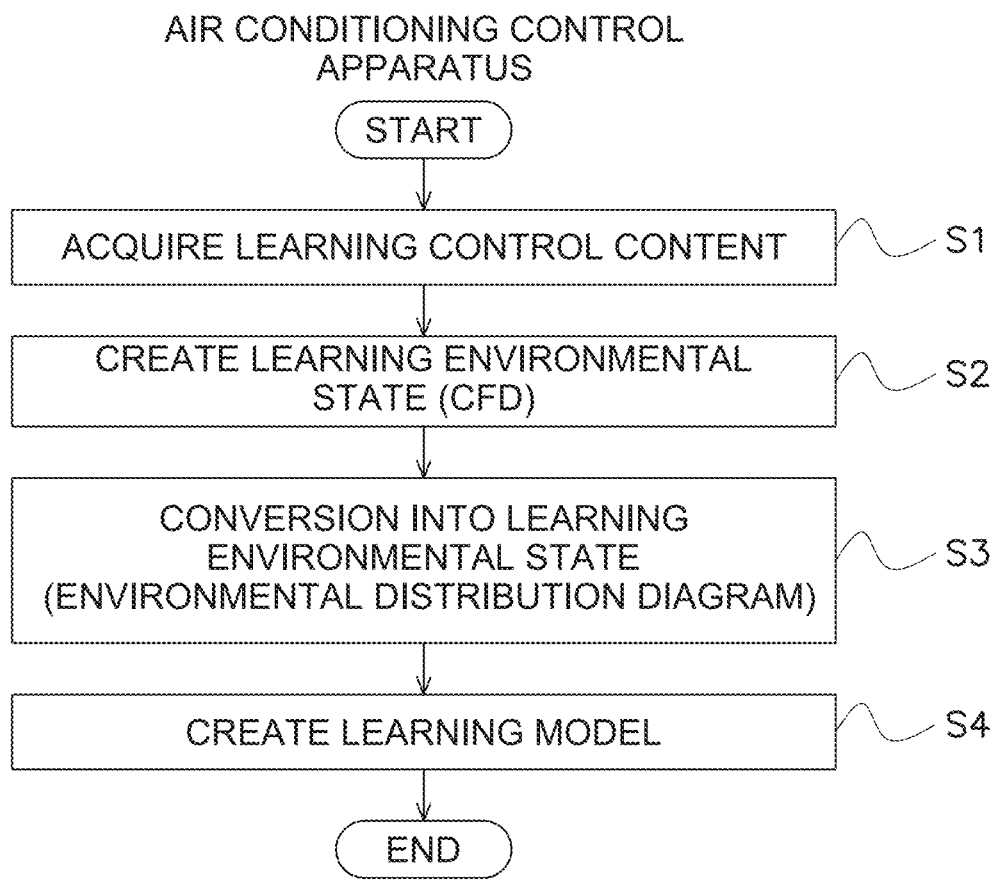
FIG. 8E is a flowchart of a learning process.

The learning process is a process of creating a learning model 43 that is to be used in the control content change process and that determines the control content 42 of the air conditioning apparatus 30. The learning process will be described with reference to the flowchart in FIG. 8E. The flowchart in FIG. 8E basically corresponds to the arrows in FIG. 3C.

The air conditioning control apparatus 10 acquires the learning control content 42L in step S1.

After acquiring the learning control content 42L, the air conditioning control apparatus 10 simulates the environmental state 41 in the target space 81 on the basis of the learning control content 42L and creates the learning environmental state (CFD) 41LC in step S2.

After creating the learning environmental state (CFD) 41LC, the air conditioning control apparatus 10 converts the learning environmental state (CFD) 41LC into the learning environmental state (environmental distribution diagram) 41LF in step S3.

After acquiring the learning environmental state (environmental distribution diagram) 41LF, the air conditioning control apparatus 10 creates the learning model 43 by using the learning environmental state (environmental distribution diagram) 41LF as an explanatory variable and using the learning control content 42L as an objective variable in step S4.

(4) Features 4-1

In an air conditioning control system according to the related art, the control content 42 to be transmitted to the air conditioning apparatus 30 is determined by reinforcement learning so as to bring the target space 81 closer to the environmental state 41 desired by a user.

However, in reinforcement learning, a reward function is determined in accordance with the environmental state 41 desired by the user, a value function is learned by using the reward function, and the control content 42 of the air conditioning apparatus 30 is determined. Thus, in a case where the control content 42 of the air conditioning apparatus 30 is to be determined in real time, the method using reinforcement learning involves an issue that a relatively long time is taken.

The air conditioning control system 100 according to the present embodiment determines the control content 42 to be transmitted to the air conditioning apparatus 30 by using the trained learning model 43. Thus, the air conditioning control system 100 is capable of determining the control content 42 to be transmitted to the air conditioning apparatus 30 more quickly and in more real time than in the case of using reinforcement learning.

4-2

In the air conditioning control system 100 according to the present embodiment, the target environmental state 41T is the environmental state 41 to be achieved in the partial space 81*a*, which is a part of the target space 81. The determined control content 42D is the control content 42 to be transmitted to the air conditioning apparatus 30 for bringing the partial space 81*a* closer to the target environmental state 41T. The learning environmental state 41L is the environmental state 41 in the partial space 81*a*. Thus, the air conditioning control system 100 is capable of bringing a part of the target space 81 into the environmental state 42 to be achieved in a pinpoint manner.

4-3

In the air conditioning control system 100 according to the present embodiment, the partial space 81*a* is a predetermined two-dimensional region in the target space 81. Thus, the air conditioning control system 100 is capable of bringing the predetermined two-dimensional region in the target space 81 into the environmental state 41 to be achieved.

4-4

The air conditioning control system 100 according to the present embodiment performs a simulation to create the learning dataset 44L of the learning model 43. Thus, the air conditioning control system 100 is capable of easily acquiring the learning dataset 44L.

4-5

In the air conditioning control system 100 according to the present embodiment, the user operates the screen of the user terminal 20, which is a user interface, to set the desired environmental state 41. Thus, the user is able to easily set the desired environmental state 41.

(5) Modifications
(5-1) Modification 1A

The learning dataset 44L may further include space layout information 45, which is information on an object in the target space 81. The space layout information 45 includes, as the information on the object in the target space 81, information regarding the position of the object and the amount of heat of the object. The position of the object is acquired from, for example, an object detection camera or the like. The amount of heat is acquired from, for example, a thermographic camera or the like.

The learning dataset 44L may further include arrangement information 46 of one or more air outlets of one or more air conditioning apparatuses 30. The arrangement information 46 can be acquired at the time of defining the target space 81.

Figure 3D:
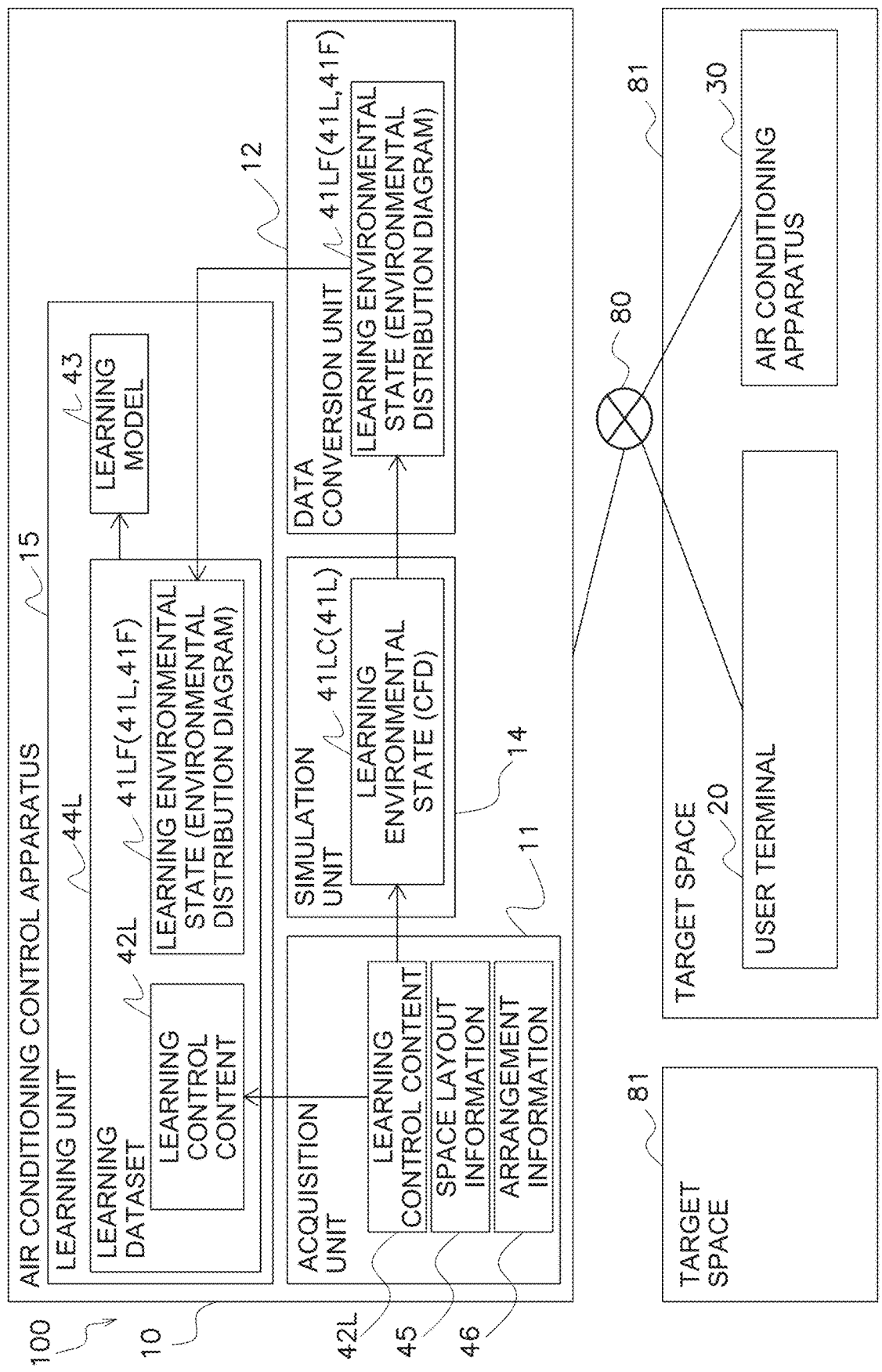
FIG. 3D is a configuration diagram of the learning process.

The space layout information 45 and the arrangement information 46 are reflected in the learning environmental state (environmental distribution diagram) 41LF. Specifically, the air conditioning control system 100 creates CFD data by using not only the control content 42 but also the space layout information 45 and the arrangement information 46 in the simulation unit 14 in the environmental state display process and the learning process. For example, as illustrated in FIG. 3D, as a result of using the space layout information 45 and the arrangement information 46 in the simulation unit 14 in the learning process, the space layout information 45 and the arrangement information 46 are reflected in the learning environmental state (environmental distribution diagram) 41LF.

As a result of including the space layout information 45 and the arrangement information 46 in the learning dataset 44L, the amount of information to be learned by the learning model 43 increases, and the air conditioning control system 100 is capable of increasing the accuracy of the determined control content 42D output by the learning model 43.

(5-2) Modification 1B

In the present embodiment, as illustrated in FIG. 3C, the air conditioning control system 100 creates the learning environmental state (environmental distribution diagram) 41LF by simulation. However, the learning environmental state (environmental distribution diagram) 41LF may be created from actual measurement values of various sensors installed in the target space 81 and corresponding to individual environmental parameters. For example, to create an environmental distribution diagram of temperature, a temperature distribution in a plane at a predetermined height from the ground is acquired from actual measurement values of a temperature sensor or the like. The method of creating an environmental distribution diagram of temperature from the temperature distribution in the plane at the predetermined height from the ground is as described in "(2-1-3) Data Conversion Unit".

As a result of creating the learning environmental state (environmental distribution diagram) 41LF not from simulation but from the actual measurement values of an environmental parameter, the air conditioning control system 100 is capable of creating a more accurate learning environmental state (environmental distribution diagram) 41LF. As a result, the air conditioning control system 100 is capable of increasing the accuracy of the determined control content 42D output by the learning model 43.

(5-3) Modification 1C

The air conditioning control system 100 according to the present embodiment uses AR so as to enable the user to grasp the current environmental state 41 in the target space 81 and designate the environmental state 41 desired by the user. However, to achieve the above-described purpose, the air conditioning control system 100 may use virtual reality (VR), mixed reality (MR), substitutional reality (SR), or the like.

(5-4) Modification 1D

In the air conditioning control system 100 according to the present embodiment, the partial space 81a is a predetermined two-dimensional region in the target space 81. However, the partial space 81a may be a predetermined three-dimensional region in the target space 81. As a result, the air conditioning control system 100 is capable of bringing the predetermined three-dimensional region in the target space 81 into the environmental state 41 to be achieved.

In the present modification, the predetermined three-dimensional region is a three-dimensional rectangular region surrounding a workspace or the like of a human. However, the predetermined three-dimensional region is not limited thereto and may be any region.

(5-4-1) Acquisition Unit

In the present modification, the target environmental state 41T acquired by the acquisition unit 11 is the environmental state 41 in a three-dimensional rectangular region in the target space 81.

(5-4-2) Simulation Unit

In the present modification, the learning environmental state 41L, simulated by the simulation unit 14 is the environmental state 41 in a three-dimensional rectangular region in the target space 81.

(5-4-3) Data Conversion Unit

Figure 11:
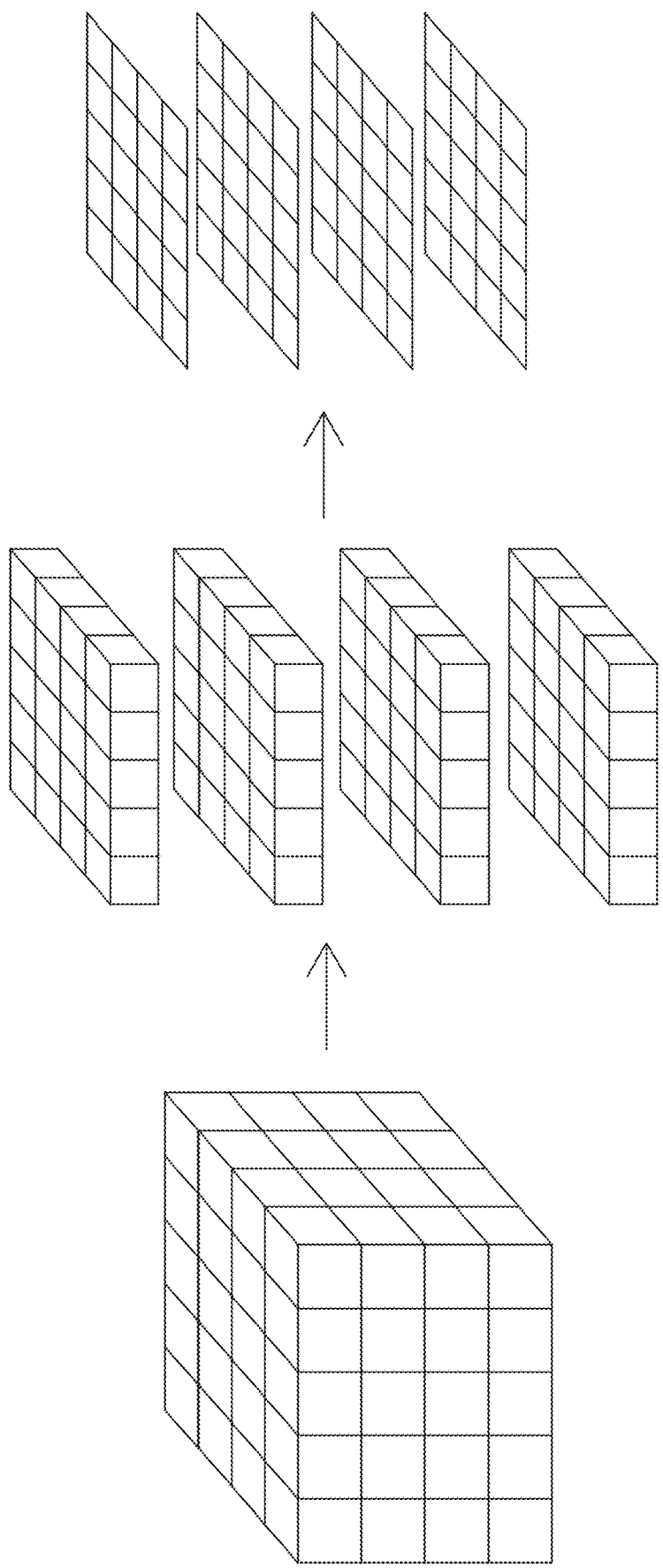
FIG. 11 is a diagram illustrating a procedure of imaging a three-dimensional temperature distribution.

In the present modification, an environmental distribution diagram created by the data conversion unit 12 is an image of a temperature distribution or the like in a three-dimensional rectangular region in the target space 81. FIG. 11 is a diagram illustrating a procedure of imaging a three-dimensional temperature distribution. As illustrated on the left in FIG. 11, the data conversion unit 12 first divides a three-dimensional rectangular region into rectangular unit blocks. In FIG. 11, the three-dimensional rectangular region is divided into unit blocks of 5 (width)×4 (height)×4 (depth). At this time, each unit block includes at least one simulation point of temperature or the like. Subsequently, the data conversion unit 12 aggregates values of temperature included in each unit block. As the aggregation, for example, an average value of one or more temperatures included in each unit block is calculated. As a result, one temperature is determined for each unit block. Subsequently, as illustrated in the center in FIG. 11, the data conversion unit 12 divides the three-dimensional rectangular region in the height direction. In the center in FIG. 11, the three-dimensional rectangular region is divided into four blocks. Each unit block is associated with one temperature, and thus the four blocks can be regarded as four planes in which each pixel has a temperature value, as illustrated on the right in FIG. 11. The four planes are environmental distribution diagrams obtained by imaging a temperature distribution in the three-dimensional rectangular region. The environmental distribution diagram is created for each of environmental parameters, such as temperature and humidity. Thus, in FIG. 11, for example, in the case of creating environmental distribution diagrams for temperature and humidity, two (temperature and humidity) environmental distribution diagrams are created for each of the planes, and thus eight environmental distribution diagrams are created in total. In general, in the case of creating environmental distribution diagrams for N environmental parameters in a three-dimensional rectangular region of W (width)×H (height)×D (depth), the number of environmental distribution diagrams in one set is H×N, and each environmental distribution diagram has the number of pixels of W×D. In the above description, the three-dimensional rectangular region is divided in the height direction, but the three-dimensional rectangular region may be divided in the width direction or the depth direction.

(5-4-4) Control Content Determination Unit

In the present modification, the determined control content 42D calculated by the control content determination unit 13 is the control content 42 to be transmitted to the air conditioning apparatus 30 for bringing the three-dimensional rectangular region in the target space 81 closer to the target environmental state 41T.

(5-4-5) Learning Unit

In the present modification, the learning unit 15 creates the learning model 43 in a manner similar to that in the present embodiment.

5-5

The embodiment of the present disclosure has been described above. It is to be understood that the embodiment and the details can be variously changed without deviating from the gist and scope of the present disclosure described in the claims.

The invention claimed is:

1. An air conditioning control system configured to transmit determined control content to an air conditioning apparatus and adjust an environmental state in a target space of an air conditioning operation performed by the air conditioning apparatus, the air conditioning control system comprising:
a processor; and
a storage,
the processor being configured to
acquire a target environmental state to which the environmental state is to be adjusted, the target environmental state being represented as image data created based on a simulation of the environmental state in the target space using current control content of the air conditioning apparatus; and
use a learning model to create the determined control content based on the image data, the learning model having an input and an output, the input being the image data and the output being the determined control content, and
transmit the determined control content to the air conditioning apparatus in order to bring the target space to the target environmental state,
the learning model having been trained by using, as a learning dataset, learning control content and a learning environmental state, the learning environmental state being created by simulating the environmental state in the target space based on the learning control content, the learning environmental state being represented as learning image data.

2. The air conditioning control system according to claim 1, wherein
the target environmental state is the environmental state to be achieved in a partial space, the partial space being a part of the target space,
the determined control content is the control content to be transmitted to the air conditioning apparatus in order to bring the partial space closer to the target environmental state, and
the learning environmental state relates to the partial space.

3. The air conditioning control system according to claim 2, wherein
the partial space is a predetermined three-dimensional region in the target space.

4. The air conditioning control system according to claim 2, wherein
the partial space is a predetermined two-dimensional region in the target space.

5. The air conditioning control system according to claim 2, wherein
the learning environmental state is an output result of one or more simulations performed by using the learning control content as an input.

6. The air conditioning control system according to claim 2, wherein
the determined control content is an air conditioning control parameter including a value relating to at least one of temperature, humidity, air flow direction, air volume, and air velocity.

7. The air conditioning control system according to claim 2, wherein
the environmental state is an environmental parameter at one or more locations in the target space, and
the environmental parameter includes a value relating to at least one of temperature, humidity, air flow direction, air volume, and air velocity.

8. The air conditioning control system according to claim 2, wherein
the target environmental state is determined based on a desire relating to the environmental state input via a user interface.

9. The air conditioning control system according to claim 2, wherein the learning dataset further includes space layout information, the space layout information being information on an object in the target space.

10. The air conditioning control system according to claim 9, wherein
the space layout information includes, as the information on the object in the target space, information regarding an amount of heat.

11. The air conditioning control system according to claim 2, wherein
the learning dataset further includes arrangement information of one or more air outlets of one or more air conditioning apparatuses.

12. The air conditioning control system according to claim 1, wherein
the learning environmental state is created by performing a plurality of simulations performed by using the learning control content.

13. The air conditioning control system according to claim 1, wherein
the determined control content is an air conditioning control parameter including a value relating to at least one of temperature, humidity, air flow direction, air volume, and air velocity.

14. The air conditioning control system according to claim 1, wherein
the environmental state is an environmental parameter at one or more locations in the target space, and
the environmental parameter includes a value relating to at least one of temperature, humidity, air flow direction, air volume, and air velocity.

15. The air conditioning control system according to claim 1, wherein
the target environmental state is determined based on the simulation and a desire relating to the environmental state input via a user interface.

16. The air conditioning control system according to claim 1, wherein the learning dataset further includes space layout information, the space layout information being information on an object in the target space.

17. The air conditioning control system according to claim 16, wherein
the space layout information includes, as the information on the object in the target space, information regarding an amount of heat.

18. The air conditioning control system according to claim 1, wherein
the learning dataset further includes arrangement information of one or more air outlets of one or more air conditioning apparatuses.

19. The air conditioning control system according to claim 1, wherein
the image data represents an environmental distribution diagram of an environmental parameter, the environmental parameter being a value related to at least one of temperature, humidity, air flow direction, air volume, or air velocity in the target space.

* * * * *